(12) United States Patent
Shumkov et al.

(10) Patent No.: US 12,088,184 B2
(45) Date of Patent: Sep. 10, 2024

(54) CURRENT REGULATOR SYSTEM

(71) Applicant: TEXAS INSTRUMENTS INCORPORATED, Dallas, TX (US)

(72) Inventors: Ivan Shumkov, Freising (DE); Erich-Johann Bayer, Freising (DE); Ruediger Ganz, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/143,808

(22) Filed: May 5, 2023

(65) Prior Publication Data

US 2023/0308004 A1    Sep. 28, 2023

Related U.S. Application Data

(62) Division of application No. 17/136,442, filed on Dec. 29, 2020, now Pat. No. 11,682,961.

(60) Provisional application No. 62/984,049, filed on Mar. 2, 2020.

(51) Int. Cl.
   *H02M 3/158* (2006.01)
   *H02M 1/00* (2006.01)
(52) U.S. Cl.
   CPC ....... *H02M 1/0009* (2021.05); *H02M 3/1582* (2013.01)
(58) Field of Classification Search
   CPC . H02M 1/0009; H02M 1/0003; H02M 1/0025
   See application file for complete search history.

(56) References Cited

U.S. PATENT DOCUMENTS

| | | | |
|---|---|---|---|
| 8,305,055 B2 | 11/2012 | Wu et al. | |
| 8,441,241 B2 | 5/2013 | Krishnamurthy | |
| 8,912,769 B2 | 12/2014 | Lin et al. | |
| 10,826,396 B1* | 11/2020 | Wu | H02M 3/158 |
| 2007/0091036 A1 | 4/2007 | Han et al. | |
| 2007/0290657 A1 | 12/2007 | Cretella | |
| 2009/0167364 A1 | 7/2009 | Bramante | |
| 2010/0066169 A1 | 3/2010 | Apfel | |
| 2014/0078790 A1 | 3/2014 | Lin | |
| 2014/0266110 A1* | 9/2014 | Yuan | H02M 3/156 323/282 |
| 2014/0375291 A1 | 12/2014 | Tomasz | |

(Continued)

OTHER PUBLICATIONS

Extended European Search Report dated Jul. 5, 2023.

*Primary Examiner* — Alex Torres-Rivera
(74) *Attorney, Agent, or Firm* — Charles F. Koch; Frank D. Cimino

(57) ABSTRACT

An example of a power supply system includes a switching voltage regulator comprising at least one switch configured to conduct an input current to generate an output voltage responsive to a switching signal and based on an input voltage. The system also includes a current regulator configured to generate a current sample voltage based on an amplitude of the input current relative to a reference current defining a maximum average amplitude setpoint of the input current to set a switching time defining a switching period of the at least one switch. The system also includes a switch controller configured to provide the switching signal to control the at least one switch based on an amplitude of the output voltage relative to a reference voltage and based on the switching time.

8 Claims, 13 Drawing Sheets

(56) References Cited

U.S. PATENT DOCUMENTS

2016/0261187 A1* 9/2016 Deng .................. H02M 3/1588
2019/0068054 A1   2/2019 Ongaro
2021/0083578 A1   3/2021 King

* cited by examiner

CURRENT REGULATOR SYSTEM

CROSS-REFERENCE TO RELATED APPLICATION

This application is a divisional of U.S. application Ser. No. 17/136,442 filed Dec. 29, 2020, which claims priority to U.S. Provisional Application Ser. No. 62/984,049, filed Mar. 2, 2020, both of which are incorporated herein in their entirety.

TECHNICAL FIELD

This description relates generally to electronic circuits, and more particularly to a current regulator system.

BACKGROUND

Power supply circuits can be implemented in a variety of different ways. Examples of power supply circuits include synchronous rectifier power converters, asynchronous rectifier power converters, resonant power converters, and any of a variety of other types of switching power converters. A typical power supply circuit can thus activate one or more switches to convert an input voltage to an output voltage. Power supply circuits are typically implemented in wireless electronic devices. As a result, the input voltage is typically provided by a battery. Thus, the operational life of the battery is typically limited by the amplitude of the input current that is provided from the input voltage to generate the output voltage in the power supply circuit. For example, in a switching power supply circuit that provides current through an inductor, the operational life of the battery can be based on an average amplitude of the input current through an operating cycle of the switching power supply circuit.

SUMMARY

An example circuit includes a switching voltage regulator having a first input, a second input, and an output. The first input is coupled to a source of an input current. A current regulator has an input, a first output and a second output. The input is coupled to the source of the input current. The current regulator provides at the first output a comparison signal having a logic state responsive to a current sampling voltage. The current regulator provides a reference current at the second output proportional to a maximum average amplitude setpoint of the input current over a switching period of the switching voltage regulator. A switch controller has a first input, a second input, a third input and an output, the first input coupled to the first output of the current regulator circuit. The second input is coupled to the output of the switching voltage regulator, and the third input is adapted to be coupled to a reference voltage source. The output is coupled to the second input of the switching voltage regulator.

An example of a power supply system includes a switching voltage regulator comprising at least one switch configured to conduct an input current to generate an output voltage responsive to a switching signal and based on an input voltage. The system also includes a current regulator configured to generate a current sample voltage based on an amplitude of the input current relative to a reference current defining a maximum average amplitude setpoint of the input current to set a switching time defining a switching period of the at least one switch. The system also includes a switch controller configured to provide the switching signal to control the at least one switch based on an amplitude of the output voltage relative to a reference voltage and based on the switching time.

An example of an integrated circuit (IC) includes a switching voltage regulator comprising at least one switch configured to conduct an input current to generate an output voltage responsive to a switching signal and based on an input voltage. The IC also includes a current regulator configured to generate a current sample voltage across a sampling capacitor. The current sample voltage can be based on an amplitude of the input current relative to a reference current that is set at a first external pin and which is proportional to a maximum average amplitude setpoint of the input current to set a switching time defining a switching period of the at least one switch. The IC includes an input pin adapted to be coupled to a source of the reference current. The IC further includes a switch controller configured to provide the switching signal to control the at least one switch based on the switching time and based on an amplitude of the output voltage relative to a reference voltage that is set at a second external pin.

DETAILED DESCRIPTION

Figure 1:
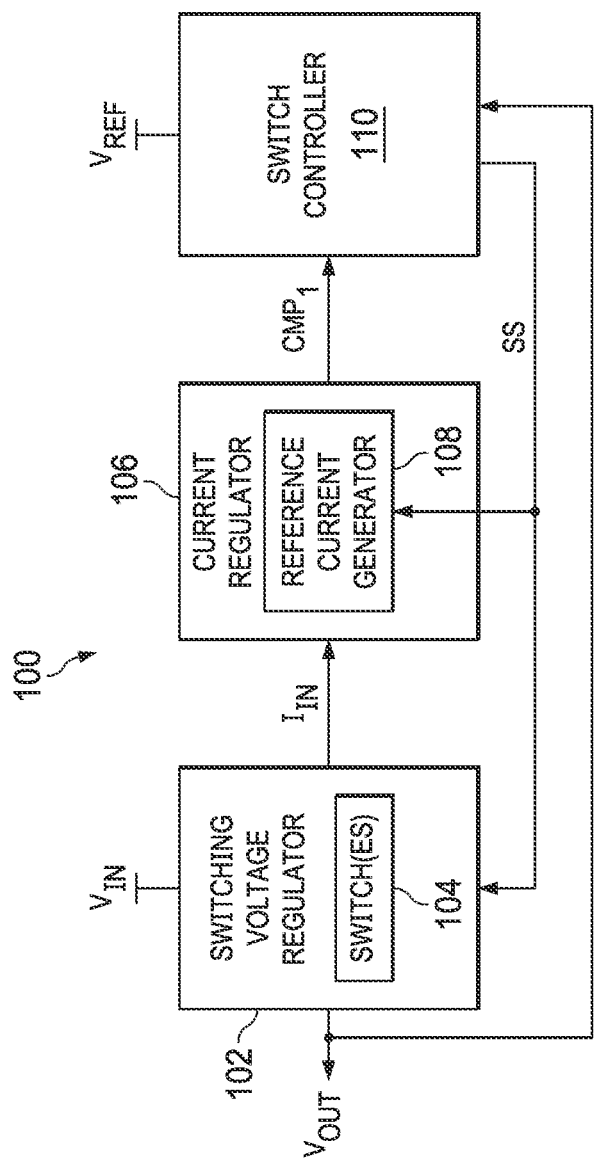
FIG. 1 is an example of a block diagram of a power supply system.

This description relates generally to electronic circuits, and more particularly to a current regulator system. The current regulator system can be included in a power supply system, such as a switching power supply system. The power supply system can also include a switching voltage regulator that includes at least one switch that is controlled by a switch signal to provide an input current from an input voltage and through an inductor to generate an output voltage. The power supply system further includes a switch controller that is configured to generate the switch signal, such as based on the output voltage relative to a reference voltage, and to a current sampling voltage that has an amplitude associated with a switching time of the switching voltage regulator to regulate an amplitude of the input current.

As an example, the input voltage is provided from a battery. Therefore, the current regulator system can be configured to regulate the amplitude of the input current to mitigate current draw from the battery, and to therefore extend the operating life of the battery. The current regulator system can include a sampling capacitor that is configured to generate the current sampling voltage that is based on a sampling current. The sampling current can be based on a charging current that is associated with the input current and a reference current. As one example, the charging current is generated based on the input current and which is proportional to the input current. As another example, the charging current is a current that has a fixed amplitude that is estimated to be proportional to the input current. The reference current can have an amplitude that is proportional to a maximum average amplitude setpoint of the input current over a switching period.

The current sampling voltage can have an amplitude that is based on the amplitude of the charging current minus a reference current during a first switching phase of the switching voltage regulator. For example, the reference current is arranged to flow from the sampling capacitor. Thus, during the first switching phase of the switching voltage regulator, the amplitude of the current sampling voltage can increase. During a second switching phase of the switching voltage regulator, the amplitude of the current sampling voltage can be based on the reference current only, such that the amplitude of the current sampling voltage can decrease during the second switching phase of the switching voltage regulator. The duration of time between the beginning of charging of the sampling capacitor in the first sampling phase to the end of the discharging of the sampling capacitor in the second sampling phase (e.g., between equal charges of approximately zero) can define the switching time of the switching voltage regulator. Thus, the switch controller can monitor the amplitude of the current sampling voltage to switch between the switching phases of the switching voltage regulator, and to thus regulate the amplitude of the output voltage and the input current.

FIG. 1 is an example of a block diagram of a power supply system 100. The power supply system 100 can be implemented in any of a variety of wireless electronic devices, such as laptop computers, tablet computers, smart phones, or any of a variety of other electronic devices. The power supply system 100 is configured to generate an output voltage $V_{OUT}$ from an input voltage $V_{IN}$. As an example, the input voltage $V_{IN}$ is provided from a battery. As described herein, the power supply system 100 can provide regulation of an input current $I_{IN}$ that is drawn from a battery to mitigate an average amplitude of the input current $I_{IN}$, and therefore to extend the operational life of the battery. As an example, the power supply system 100 is fabricated on or as part of an integrated circuit (IC).

The power supply system 100 includes a switching voltage regulator 102 that includes at least one switch 104 that is controlled by a respective at least one switching signal, shown in the example of FIG. 1 as a signal SS, to generate the output voltage $V_{OUT}$ based on the input voltage $V_{IN}$. As an example, the switching voltage regulator 102 operates as a buck regulator or a boost regulator, and/or operates in buck and boost modes, to generate the output voltage $V_{OUT}$. For example, the switch(es) 104 include a high-side switch (e.g., P-channel field effect transistor (PFET)) and a low-side transistor (e.g., N-channel field effect transistor (NFET)) that are alternately activated to provide current through an inductor to generate the output voltage $V_{OUT}$ at an output of the switching voltage regulator 102. As described herein, the activation of the switch(es) 104 can be defined by switching phases, such as a first switching phase and a second switching phase, that define changes in the current through the inductor and which collectively define a switching period of the switching voltage regulator 102.

The power supply system 100 also includes a current regulator system 106 that is configured to regulate an amplitude of the input current $I_{IN}$. As described above, the input current $I_{IN}$ can be drawn from a battery, such that monitoring and regulating the amplitude of the input current $I_{IN}$ can result in an extension of the operational life of the battery. In the example of FIG. 1, the current regulator system 106 includes a reference current generator 108 that is configured to generate a reference current that has an amplitude that is proportional to a maximum average amplitude setpoint of the input current $I_{IN}$ over a switching period. As an example, the reference current generator 108 is set at an external pin of the associated IC on which the power supply system 100 is fabricated (e.g., as a grounded resistor).

The current regulator system 106 can include a sampling capacitor that is configured to generate a current sampling voltage $V_{SMPL}$ that is based on a charging current that is associated with the input current $I_{IN}$ and based on the reference current. As one example, the charging current is a current that is generated based on the input current $I_{IN}$ and which is proportional to the input current $I_{IN}$. As another example, the charging current is a current that has a fixed amplitude that is estimated to be proportional to the input current. For example, the charging current and the reference current are each proportioned in amplitude with respect to the input current $I_{IN}$, such that the reference current is proportional to the maximum average amplitude setpoint of the input current $I_{IN}$ over a switching period.

As an example, the current sampling voltage $V_{SMPL}$ has an amplitude that is based on the amplitude of the charging current minus the reference current during a first switching phase of the switching voltage regulator 102, such as defined by the switching signal(s) SS. For example, the reference current flows from the sampling capacitor to pull current away from the charging current that is provided to the sampling capacitor. Thus, during the first switching phase of the switching voltage regulator 102, the amplitude of the current sampling voltage $V_{SMPL}$ can increase, and can be proportional to the sensed amplitude of the input current $I_{IN}$. During a second switching phase of the switching voltage regulator 102, the amplitude of the current sampling voltage $V_{SMPL}$ can be based on the reference current but not on the charging current. For example, the switching signal(s) SS can include signals that operate switches to control the charging current being provided to the sampling capacitor. Therefore, the amplitude of the current sampling voltage $V_{SMPL}$ can decrease during the second switching phase of the switching voltage regulator 102, and can therefore be proportional to the target regulation amplitude of the input current $I_{IN}$.

For example, the current regulator system 106 includes a sampling comparator that is configured to identify approximately zero volts across the sampling capacitor, and thus an approximate zero voltage amplitude of the current sampling voltage $V_{SMPL}$. As described herein, the term "approximately" can include some deviation from an exact value (e.g., +/−5%). Therefore, the sampling comparator can identify an approximately equal amplitude of the current sampling voltage $V_{SMPL}$ across the sampling capacitor at the beginning and end of a given switching period of the switching voltage regulator 102. In the example of FIG. 1, the output of the sampling comparator is shown as a comparison signal $CMP_1$.

The power supply system 100 further includes a switch controller 110. The switch controller 110 is configured to provide the switching signal(s) SS responsive to the comparison signal $CMP_1$. For example, the sampling comparator monitors the amplitude of the current sampling voltage $V_{SMPL}$ to switch from the second switching phase of the switching voltage regulator 102 to the first switching phase of the switching voltage regulator 102, and thus to a next switching period of the switching voltage regulator 102. The next switching period can also be initiated based on an amplitude of the output voltage $V_{OUT}$ relative to a reference voltage $V_{REF}$. As an example, the reference voltage $V_{REF}$ can be set at an external pin of the associated IC on which the power supply system 100 is fabricated (e.g., as a fixed voltage source). Therefore, the switch controller 110 can control the switching time of the switching voltage regulator 102 based on the amplitude of the current sampling voltage $V_{SMPL}$. For example, the switch controller 110 also includes a state machine that is configured to generate the switching signal(s) SS, such as based on the amplitude of the current sampling voltage $V_{SMPL}$ and the amplitude of the output voltage $V_{OUT}$ relative to the reference voltage $V_{REF}$.

As a result of the switch controller 110 controlling the switching period of the switching voltage regulator 102 based on the current sampling voltage $V_{SMPL}$, the power supply system 100 can regulate the amplitude of the input current $I_{IN}$ to mitigate the power consumption from the associated battery, thereby extending the operational life of the battery. For example, by implementing the reference current generator 108 to pull the reference current from the sampling capacitor and providing the switching period transition on the time between a beginning amplitude of the current sampling voltage $V_{SMPL}$ in the first switching phase is approximately equal to a final amplitude of the current sampling voltage $V_{SMPL}$ in the second switching phase, the power supply system 100 can reduce the average amplitude of the input current $I_{IN}$ through the switching period of the switching voltage regulator 102. Accordingly, the power supply system 100 can extend the operational life of the battery that provides the input voltage $V_{IN}$. Additionally, as described in greater detail herein, the power supply system 100 can operate in any of a variety of waveforms of the current through the inductor of the switching voltage regulator 102.

Figure 2:
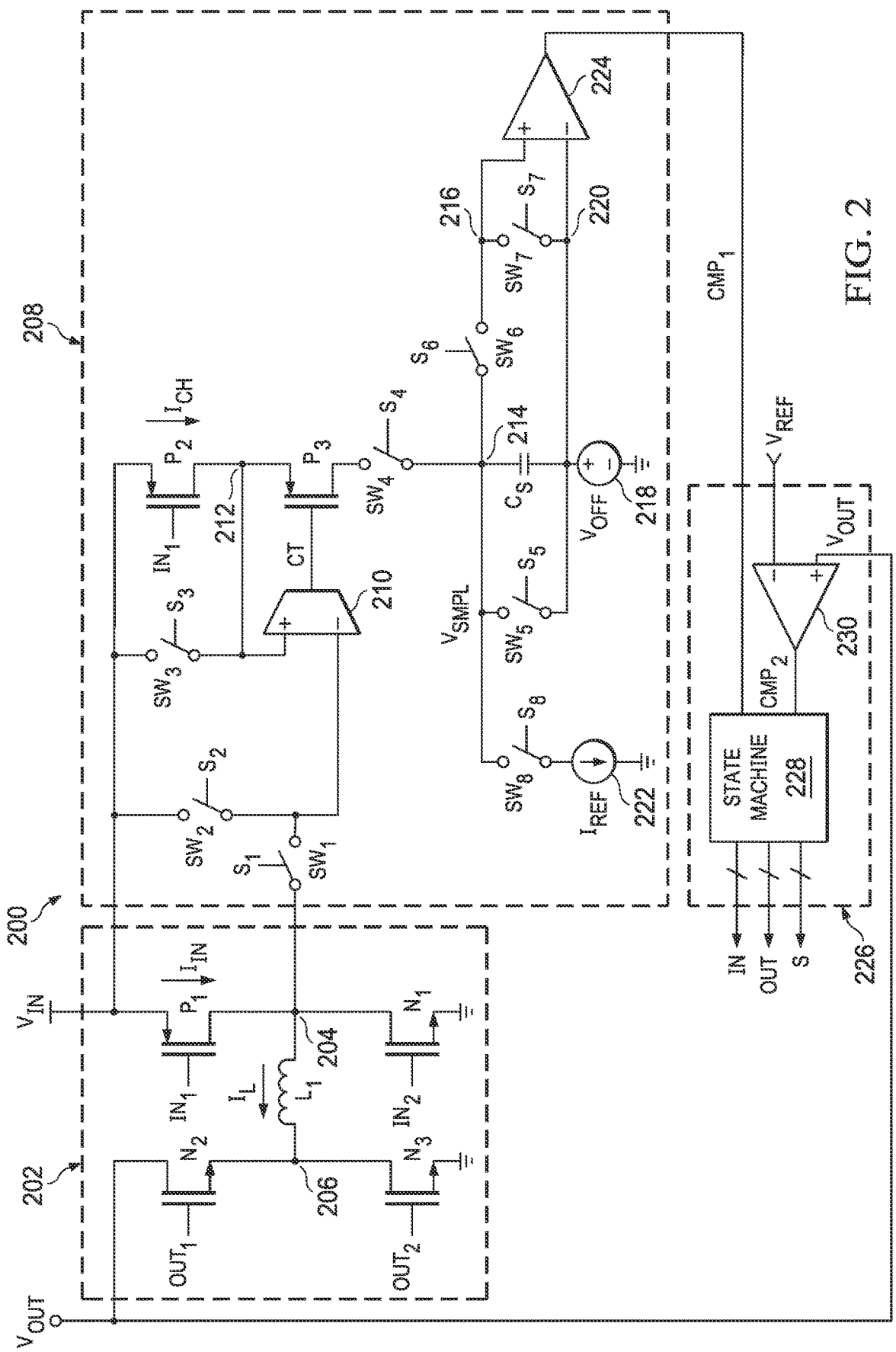
FIG. 2 is an example of a schematic electrical circuit diagram of a power supply circuit.

FIG. 2 is an example of a schematic electrical circuit diagram of a power supply circuit 200. The power supply circuit 200 can be implemented in any of a variety of wireless electronic devices, such as laptop computers, tablet computers, smart phones, or any of a variety of other electronic devices. The power supply circuit 200 is configured to generate an output voltage $V_{OUT}$ from an input voltage $V_{IN}$. The power supply circuit 200 can be the power supply system 100 in the example of FIG. 1. Therefore, reference is to be made to the example of FIG. 1 in the following description of the example of FIG. 2.

The power supply circuit 200 includes a switching voltage regulator 202. The switching voltage regulator 202 includes a high-side switch, shown as a PFET $P_1$, a low-side switch, shown as an NFET $N_1$, a first output switch, shown as an NFET $N_2$, and a second output switch, shown as an NFET $N_3$. The PFET $P_1$ interconnects the input voltage $V_{IN}$ at a source and a switching node 204 at a drain, and the NFET $N_1$ interconnects the switching node 204 at a drain and a low-voltage rail, shown in the example of FIG. 2 as ground, at a source. The NFET $N_2$ interconnects the output voltage $V_{OUT}$ at a drain and a switching node 206 at a source, and the NFET $N_3$ interconnects the switching node 206 at a drain and the low-voltage rail at a source. An inductor $L_1$ interconnects the switching nodes 204 and 206 and is configured to conduct a current $I_L$.

The PFET $P_1$ is controlled by a switching signal $IN_1$, the NFET $N_1$ is controlled by a switching signal $IN_2$, the NFET $N_2$ is controlled by a switching signal $OUT_1$, and the NFET $N_3$ is controlled by a switching signal $OUT_2$. The activation of the FETs $P_1$, $N_1$, $N_2$, and $N_3$ in a sequence provides the current $I_L$ through the inductor $L_1$ in switching phases defined by the switching signals $IN_1$, $IN_2$, $OUT_1$, and $OUT_2$, respectively. For example, the activation of the PFET $P_1$ and NFET $N_3$ provides the input current $I_{IN}$ to flow from the input voltage $V_{IN}$ to the switching node 204 during the first switching phase based on the switching signal $IN_1$ and $OUT_2$, such that the current $I_L$ is approximately equal to the input current $I_{IN}$ during the first switching phase of the switching voltage regulator 202. During the second switching phase of the switching voltage regulator 202, the PFET $P_1$ and NFET $N_3$ are deactivated and the NFET $N_1$ and NFET $N_2$ are activated by the switching signal $IN_2$ and $OUT_1$ to conduct the current $I_L$ from the low-voltage rail through the inductor $L_1$.

Figure 3:
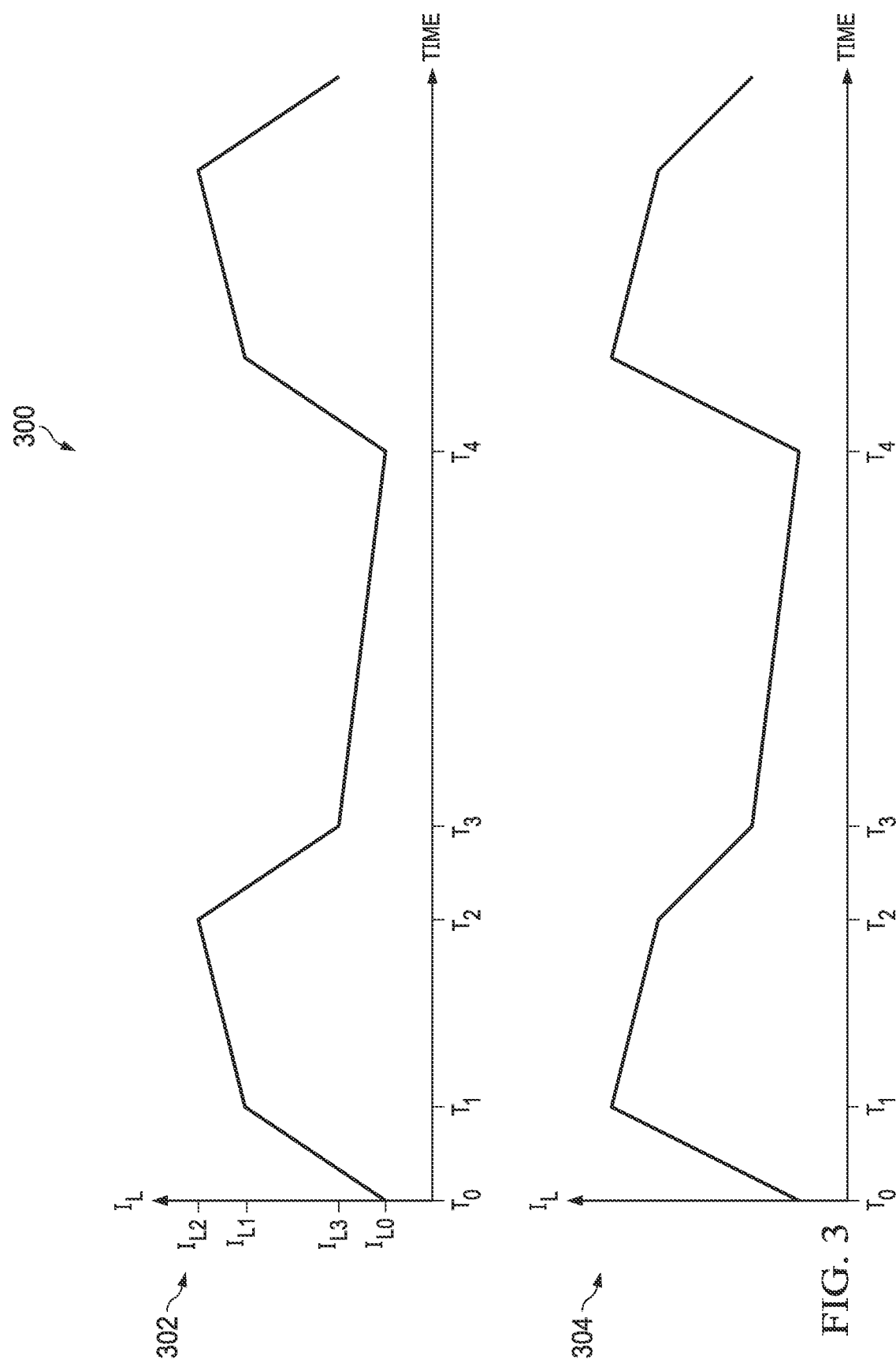
FIG. 3 is an example of timing diagrams.

FIG. 3 is an example of timing diagrams. The timing diagrams include a first timing diagram 302 that shows inductor current $I_L$ plotted as a function of time for a converter operating in buck mode, and a second timing diagram 304 that shows inductor current $I_L$ plotted as a function of time for a converter operating in boost mode. The inductor current $I_L$ can be the current through the inductor $L_1$ of the switching voltage regulator 202 in the example of FIG. 2. Therefore, reference is to be made to the example of FIG. 2 in the following description of the example of FIG. 3. For simplicity sake, the transition times of the timing diagrams 302 and 304 are aligned. However, the transition times can differ between the buck and boost modes.

In the first timing diagram 302, the switching voltage regulator 202 begins a first switching phase at a time T0. At the time T0, the PFET $P_1$ and the NFET $N_3$ are activated by the switching signals $IN_1$ and $OUT_2$, respectively. Therefore, the input current $I_{IN}$ flows from the input voltage $V_{IN}$, through the PFET $P_1$, and through the inductor $L_1$ as the current $I_L$, and through the NFET $N_3$. Thus, in the example of FIG. 3, the current $I_L$ is demonstrated as increasing from an amplitude of $I_{L0}$, which is an amplitude greater than or equal to zero, to an amplitude $I_{L1}$ at a time $T_1$. At the time $T_1$, the NFET $N_3$ is deactivated by the switching signal $OUT_2$ and the NFET $N_2$ is activated by the switching signal $OUT_1$. Therefore, the input current $I_{IN}$ flows from the input voltage $V_{IN}$, through the PFET $P_1$, and through the inductor $L_1$ as the current $I_L$, and through the NFET $N_2$, such as to charge an output capacitor (not shown in the example of FIG. 2). Thus, in the example of FIG. 3, the current $I_L$ is demonstrated as increasing from the amplitude $I_{L1}$ to an amplitude $I_{L2}$ at a time $T_2$, and thus at a lesser slope than between the times $T_0$ and $T_1$.

The switching voltage regulator 202 switches from the first switching phase to the second switching phase at the time $T_2$. At the time $T_2$, the PFET $P_1$ is deactivated and the NFET $N_1$ is activated by the switching signals $IN_1$ and $IN_2$, respectively, and the NFET $N_2$ remains activated. Therefore, the input current $I_{IN}$ ceases, and the current $I_L$ flows from the low-voltage rail, through the NFET $N_1$, through the inductor $L_1$, and through the NFET $N_2$. Thus, in the example of FIG.

3, the current $I_L$ is demonstrated as decreasing from the amplitude $I_{L2}$ to an amplitude $I_{L3}$ at a time $T_3$, with the amplitude $I_{L3}$ being less than the amplitude $I_{L1}$. At the time $T_3$, the NFET $N_2$ is deactivated by the switching signal OUT$_1$ and the NFET $N_3$ is activated by the switching signal OUT$_2$. Therefore, the current $I_L$ flows from the low-voltage rail, through the NFET $N_1$, through the inductor $L_1$, and through the NFET $N_3$. Thus, in the example of FIG. 3, the current $I_L$ is demonstrated as decreasing from the amplitude $I_{L3}$ to the initial amplitude $I_{L0}$ at a time $T_4$. The second switching phase concludes at the time $T_4$. The first and second switching phases can define a switching period, such that a next switching period is shown in the example of FIG. 3 as beginning at the time $T_4$. For example, an idle time at which the current $I_L$ remains at zero can occur between switching periods, such as during deactivation of the power supply circuit 200 or in a discontinuous mode of operation of the power supply circuit 200.

The second timing diagram 304 is arranged similar to the first timing diagram 302, and can define a boost mode of operation of the power supply circuit 200. As an example, the boost mode of operation is based on a variation in topology of the power supply circuit 200 to vary the amplitude of the current $I_L$. The second timing diagram 304 is therefore shown to demonstrate that the principle of operation of the power supply circuit 200, as described herein, is applicable to any of a variety of inductor current waveforms.

Referring back to the example of FIG. 2, the power supply circuit 200 includes a current regulator system 208 that is configured to regulate an amplitude of the input current $I_{IN}$. As described above, the input current $I_{IN}$ can be drawn from a battery, such that monitoring and regulating the amplitude of the input current $I_{IN}$ can result in an extension of the operational life of the battery. In the example of FIG. 2, the current regulator system 208 includes a transconductance amplifier 210 that has a first input that is coupled to the switching node 204 through a first switch SW$_1$ controlled by a switching signal S$_1$ and to the input voltage $V_{IN}$ through a second switch SW$_2$ controlled by a switching signal S2. The transconductance amplifier 210 also has a second input that is coupled to the input voltage $V_{IN}$ through a third switch SW$_3$ controlled by a switching signal S3 and to a third switching node 212. The third switching node 212 is coupled to the input voltage $V_{IN}$ through a PFET $P_2$. As an example, the PFET $P_2$ is a replica switch with respect to the PFET $P_1$, such that the PFET $P_2$ has a channel width that is scaled-down by a factor of K relative to the PFET $P_1$. In the example of FIG. 2, the PFET $P_2$ is activated by the switching signal IN$_1$, such that the PFET $P_2$ is activated concurrently with the PFET $P_1$ to generate a charging current ICH that has an amplitude approximately equal to the amplitude of the input current $I_{IN}$ divided by K (e.g., $I_{CH}=I_{IN}/K$).

The transconductance amplifier 210 is configured to generate a signal CT that is provided to a PFET $P_3$ to provide the charging current $I_{CH}$ to a sampling node 214 through a switch SW$_4$ controlled by a switching signal S$_4$. A sampling capacitor $C_S$ interconnects the sampling node 214 and a node 220. The sampling node 214 and the node 220 are also coupled by a switch SW$_5$ that is controlled by a switching signal S$_5$. A voltage source 218 provides an offset voltage Von to the node 220. Additionally, a switch SW$_6$ that is controlled by a switching signal S$_6$ interconnects the sampling node 214 and a node 216, and a switch SW$_7$ that is controlled by a switching signal S$_7$ interconnects the nodes 216 and 220.

The current regulator system 208 also includes a current source 222 that is coupled to the sampling node 214 through a switch SW$_8$ that is controlled by a switching signal S$_8$. The current source 222 be the reference current generator 108 in the example of FIG. 1. For example, the current source 222 is provided at an external pin of the associated IC on which the power supply circuit 200 is fabricated (e.g., as a grounded resistor). Therefore, when the switch SW$_8$ is closed, the current source 222 is configured to conduct the reference current $I_{REF}$ from the sampling node 214, and thus from the sampling capacitor $C_S$. For example, the offset voltage VOFF (e.g., approximately 350 mV) provides sufficient headroom for the reference current $I_{REF}$. As described above, the reference current $I_{REF}$ can have an amplitude that is proportional to a maximum average amplitude setpoint of the input current $I_{IN}$ over a switching period of the switching voltage regulator 202. For example, the proportionality of the reference current $I_{REF}$ to the maximum average amplitude setpoint of the input current $I_{IN}$ is likewise scaled by the factor of K, and thus the proportionality constant as the charging current $I_{CH}$. As an example, the reference current $I_{REF}$ has an amplitude that is expressed as follows:

$$I_{REF}=I_{TAR}/K \quad \text{Equation 1}$$

Where: $I_{TAR}$ is the maximum average amplitude setpoint of the input current $I_{IN}$ over a switching period of the switching voltage regulator 202.

The current regulator system 208 also includes a sampling comparator 224 that has inputs at the nodes 216 and 220. The sampling comparator 224 is therefore configured to monitor the sampling voltage $V_{SMPL}$ on the sampling capacitor $C_S$ when the switch SW$_6$ is closed (e.g., based on common mode operation defined by the offset voltage $V_{OFF}$). The sampling comparator 224 can generate a first comparison signal CMP$_1$ responsive to determining that the sampling voltage $V_{SMPL}$ has an amplitude of approximately zero.

The power supply circuit 200 further includes a switch controller 226. The switch controller 226 includes a state machine 228. The first comparison signal CMP$_1$ is provided to the state machine 228 that also receives a second comparison signal CMP$_2$ from a reference comparator 230. In the example of FIG. 2, the reference comparator 230 is configured to compare the output voltage $V_{OUT}$ with a fixed reference voltage $V_{REF}$. Based on the comparison signals CMP$_1$ and CMP$_2$, the state machine 228 can generate the switching signals IN, OUT, and S that are provided to the respective PFETs $P_1$ through $P_3$, the NFETs $N_1$ through $N_3$, and the switches SW$_1$ through SW$_8$. Therefore, the state machine 228 can define the first and second switching phases of the switching voltage regulator 202, and therefore the switching period of the switching voltage regulator 202. The state machine 228 can also provide the controls for operating the switches SW$_1$ through SW$_8$ to provide the operation of the current regulator system 208 in each of the first and second switching phases to regulate the amplitude of the input current $I_{IN}$.

The example power supply circuit 200 can be configured differently than shown in the example of FIG. 2. For example, the switching voltage regulator 202 is not limited to the arrangement of the high and low-side switches $P_1$, $N_1$, $N_2$, and $N_3$. As one example, the PFET $P_1$, and by extension the replica PFET $P_2$, is arranged as N-channel transistors instead.

Figure 4:
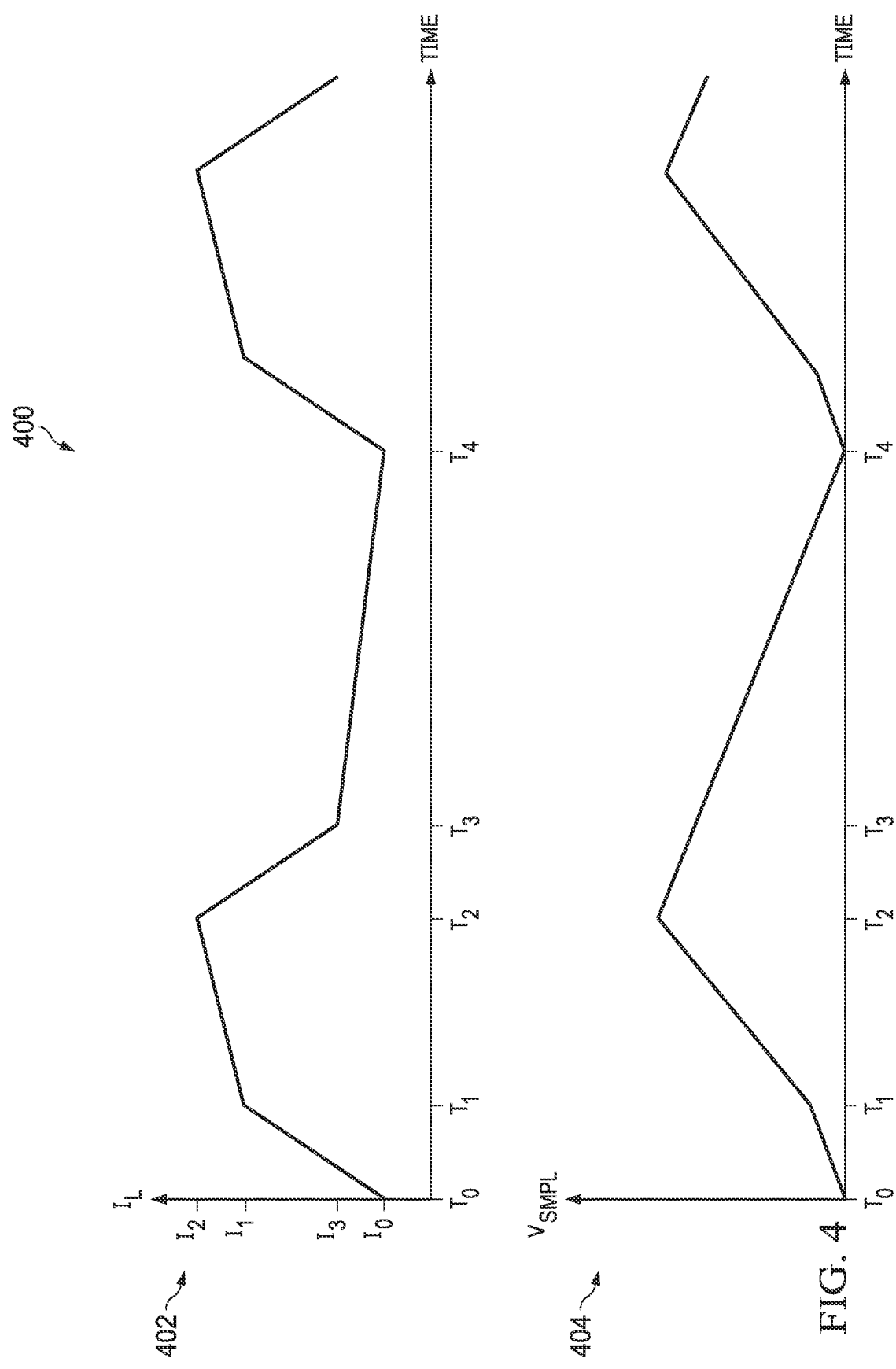
FIG. 4 is another example of timing diagrams.
Figure 5:
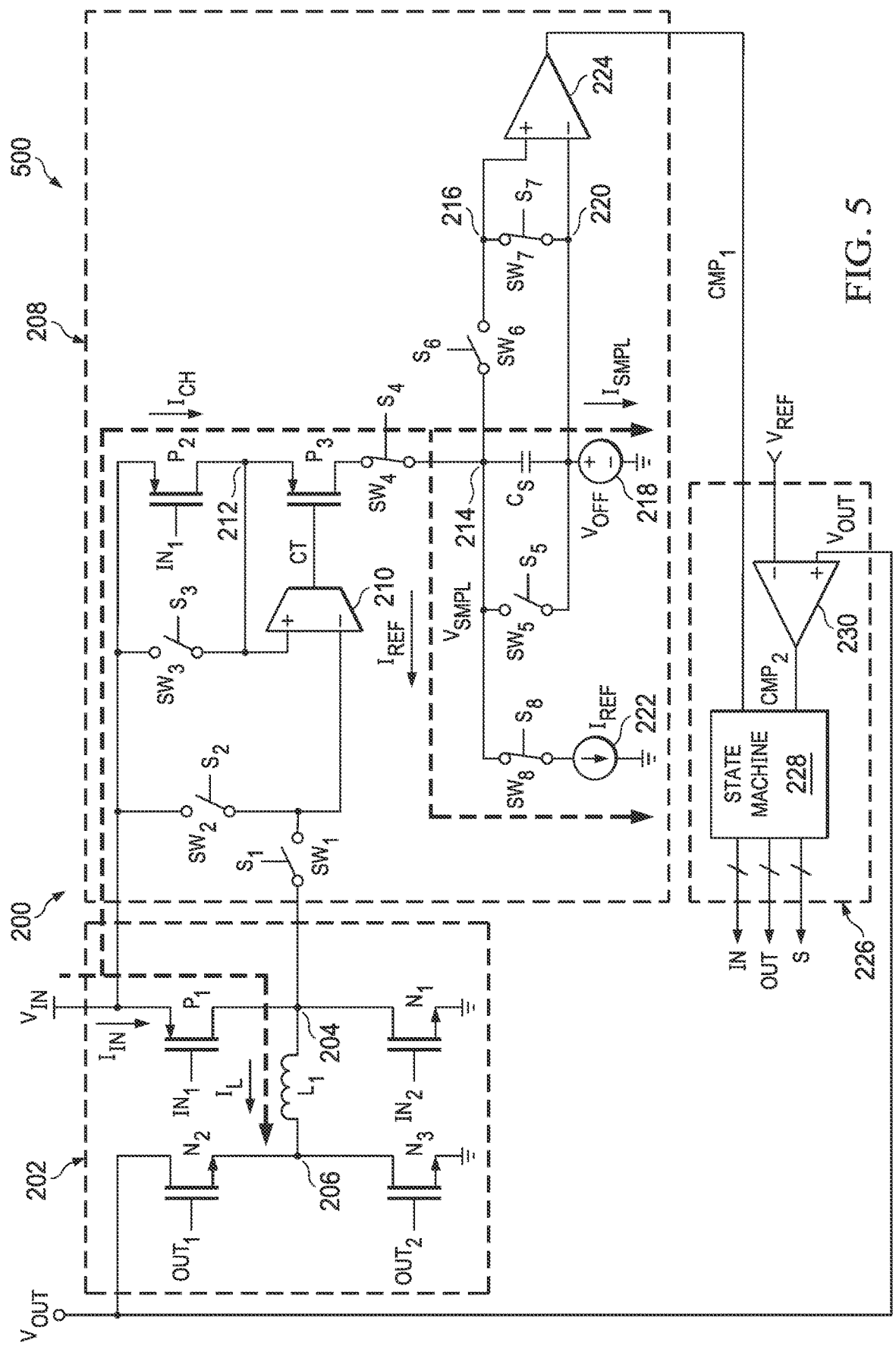
FIG. 5 is an example of a schematic electrical circuit diagram of current flow in a power supply circuit.
Figure 6:
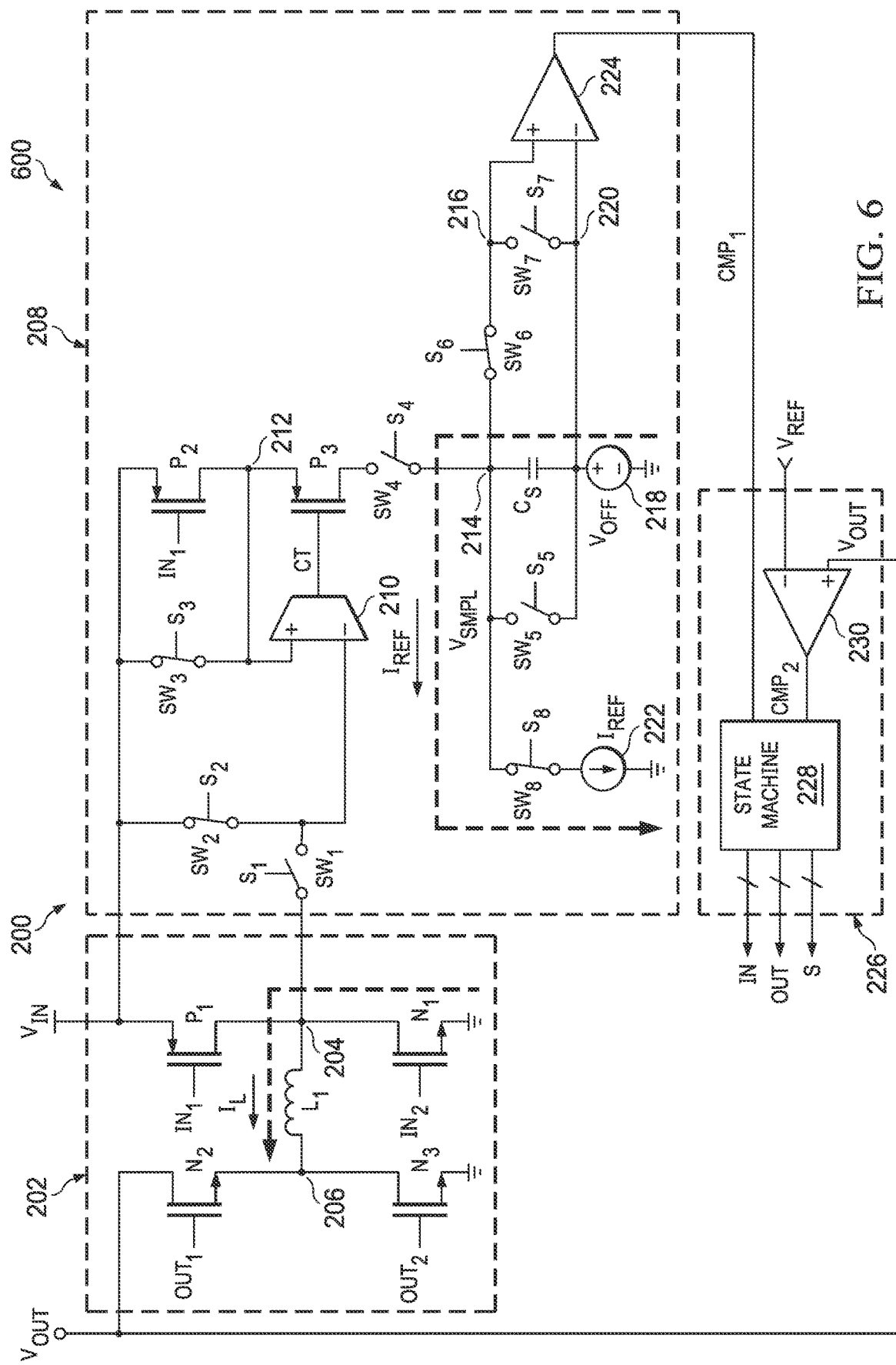
FIG. 6 is another example of a schematic electrical circuit diagram of current flow in a power supply circuit.

Operation of the power supply circuit 200 is shown in greater detail in FIGS. 4-6. FIG. 4 is another example of timing diagrams. The timing diagrams include a first timing diagram 402 that shows inductor current $I_L$ plotted as a function of time for a converter operating in buck mode. The first timing diagram 402 is therefore the same as the first timing diagram 302 in the example of FIG. 3. A second timing diagram 404 is the sampling voltage $V_{SMPL}$ plotted as a function of time. FIG. 5 is an example of a schematic electrical circuit diagram 500 of current flow in in the power supply circuit 200 in the first switching phase of the switching voltage regulator 202, and FIG. 6 is an example of a schematic electrical circuit diagram 600 of current flow in in the power supply circuit 200 in the second switching phase of the switching voltage regulator 202. Accordingly, reference is to be made to the examples of FIGS. 4-6 in the following description.

In the first timing diagram 402, the switching voltage regulator 202 begins the first switching phase at a time $T_0$. At the time $T_0$, the PFET $P_1$ and the NFET $N_3$ are activated by the switching signals $IN_1$ and $OUT_2$, respectively. Additionally, with reference to the example of FIG. 5, the switches $SW_1$, $SW_4$, $SW_7$, and $SW_8$ are closed by the switching signals $S_1$, $S_4$, $S_7$, and $S_8$, respectively. Therefore, the input current $I_{IN}$ flows from the input voltage $V_{IN}$, through the PFET $P_1$, and through the inductor $L_1$ as the current $I_L$, and through the NFET $N_3$. Thus, in the example of FIG. 4, the current $I_L$ is demonstrated as increasing from an amplitude of $I_{L0}$ to an amplitude $I_{L1}$.

At the time $T_1$, the NFET $N_3$ is deactivated by the switching signal $OUT_2$ and the NFET $N_2$ is activated by the switching signal $OUT_1$. Therefore, the input current $I_{IN}$ flows from the input voltage $V_{IN}$, through the PFET $P_1$, and through the inductor $L_1$ as the current $I_L$, and through the NFET $N_2$. Thus, the current $I_L$ continues to increase in amplitude from the time $T_1$ to the time $T_2$ during the first switching phase of the switching voltage regulator 202. Additionally, with further reference to the example of FIG. 5, during the first switching phase defined between the times $T_0$ and $T_2$, the input current $I_{IN}$ is emulated by the charging current $I_{CH}$ through the replica PFET $P_2$, based on the matched PFETs $P_1$ and $P_2$ concurrently activated by the switching signal $IN_1$, with the charging current $I_{CH}$ having a scaled amplitude approximately equal to the amplitude of the input current $I_{IN}$ divided by the channel-width scale factor K (e.g., $I_{CH}=I_{IN}/K$).

Because of the closure of the switch $SW_1$, the transconductance amplifier 210 receives an approximately equal voltage at each of the inputs at the switching node 204 and the node 212 due to the high gain of transconductance amplifier 210. The transconductance amplifier 210 can be configured as a high bandwidth transconductance amplifier 210 to track the slope of the current $I_L$ (e.g., the input current $I_{IN}$ during the first switching phase of the switching voltage regulator 202), and can be configured with low offset to measure the current $I_L$ as absolute, as opposed to relative. Low offset can be implemented, for example, by providing trimming, calibrating, or chopping of the transconductance amplifier 210, or providing auto-zero techniques using switches $SW_2$ and $SW_3$, as described in greater detail herein.

The transconductance amplifier 210 provides a control signal CT to the PFET $P_3$ to conduct the charging current $I_{CH}$ through the PFET $P_3$ and through the switch $SW_4$ to the sampling node 214. While the charging current $I_{CH}$ is provided to the sampling node 214, based on the closure of the switch $SW_8$, the reference current $I_{REF}$ flows from the sampling node 214. As a result, a sampling current $I_{SMPL}$ is provided through the sampling capacitor $C_S$. The current $I_{SMPL}$ therefore has an amplitude that is equal to the charging current $I_{CH}$ minus the reference current $I_{REF}$. Thus, the sampling current $I_{SMPL}$ begins charging the sampling capacitor $C_S$ to increase the amplitude of the sampling voltage $V_{SMPL}$. Because the switch $SW_6$ is open and the switch $SW_7$ is closed during the first switching phase of the switching voltage regulator 202, the sampling comparator 224 is not monitoring the sampling voltage $V_{SMPL}$. Therefore, the first comparison signal $CMP_1$ is asserted at a logic-high state.

Referring back to the example of FIG. 4, the switching voltage regulator 202 switches from the first switching phase to the second switching phase at the time $T_2$. At the time $T_2$, the PFET $P_1$ is deactivated and the NFET $N_1$ is activated by the switching signals $IN_1$ and $IN_2$, respectively, and the NFET $N_2$ remains activated. Additionally, with reference to the example of FIG. 6, the switches $SW_1$, $SW_4$, and $SW_7$ are opened by the switching signals $S_1$, $S_4$, and $S_7$, respectively, and the switches $SW_2$, $SW_3$, and $SW_6$ are closed by the switching signals $S_2$, $S_3$, and $S_6$, respectively. The switch $SW_8$ remains closed during the second switching phase of the switching voltage regulator 202. Therefore, the input current $I_{IN}$ ceases, and the current $I_L$ flows from the low-voltage rail, through the NFET $N_1$, through the inductor $L_1$, and through the NFET $N_2$. Thus, in the example of FIG. 4, the current $I_L$ is demonstrated as decreasing from the amplitude $I_{L2}$ to an amplitude $I_{L3}$ at a time $T_3$. At the time $T_3$, the NFET $N_2$ is deactivated by the switching signal $OUT_1$ and the NFET $N_3$ is activated by the switching signal $OUT_2$. Therefore, the current $I_L$ flows from the low-voltage rail, through the NFET $N_1$, through the inductor $L_1$, and through the NFET $N_3$. Thus, in the example of FIG. 4, the current $I_L$ is demonstrated as decreasing from the amplitude $I_{L3}$ to the initial amplitude $I_{L0}$ at a time $T_4$.

With reference to the example of FIG. 6, in the second switching phase of the switching voltage regulator 202, the PFETs $P_1$ and $P_2$ are both deactivated, which ceases the flow of the input current $I_{IN}$, and by extension, the charging current $I_{CH}$. The switches $SW_2$ and $SW_3$ are closed to provide zeroing of the transconductance amplifier 210. Because the charging current $I_{CH}$ ceases to flow, the charging current $I_{CH}$ is no longer provided to the sampling node 214. However, the switch $SW_8$ is still closed in the second switching phase of the switching voltage regulator 202, resulting in the reference current $I_{REF}$ continuing to draw charge from the sampling capacitor $C_S$. As a result, the sampling voltage $V_{SMPL}$ decreases beginning at the time $T_2$ during the second switching phase of the switching voltage regulator 202.

Due to the closure of the switch $SW_6$, the sampling comparator 224 compares the sampling voltage $V_{SMPL}$ at the sampling node 214 with the voltage at the node 220, and therefore monitors the voltage across the sampling capacitor $C_S$. Responsive to the sampling voltage $V_{SMPL}$ having an amplitude of approximately zero, and thus the sampling capacitor $C_S$ has approximately zero charge, the sampling comparator 224 can de-assert the first comparison signal $CMP_1$. As described herein, a zero amplitude of the sampling voltage $V_{SMPL}$ refers to an approximately zero amplitude across the sampling capacitor $C_S$, based on the sampling voltage $V_{SMPL}$ being referenced to the offset voltage $V_{OFF}$ at the node 220. The zero amplitude of the sampling voltage $V_{SMPL}$ can also refer to an approximately negative amplitude of the sampling voltage $V_{SMPL}$ based on the sampling capacitor $C_S$, such that the inverting input of the sampling comparator 224 has a greater voltage amplitude than the sampling voltage $V_{SMPL}$ at the non-inverting input of the sampling comparator 224.

Responsive to the de-assertion of the first comparison signal $CMP_1$, and responsive to a logic-low amplitude of the second comparison signal $CMP_2$ as provided by the reference comparator 230 (e.g., responsive to the reference voltage $V_{REF}$ being greater than the output voltage $V_{OUT}$), the state machine 228 can change the state of the switching signals IN, OUT, and S. Therefore, the state machine 228 can switch the switching voltage regulator 202 from the second switching phase to the first switching phase, and thus the beginning of a next switching period. Therefore, the state machine 228 can dictate the time duration of the switching periods of the switching voltage regulator 202 based on the amplitude of the input current $I_{IN}$ relative to the reference current $I_{REF}$ (e.g., based on the sampling voltage $V_{SMPL}$) to regulate the amplitude of the input current $I_{IN}$.

As an example, upon completion of a switching period, the state machine 228 implements an idle (e.g., sleep) mode for the power supply circuit 200, such as based on a deactivation mode for the power supply circuit 200 or for a discontinuous mode of operation for the switching voltage regulator 202. For example, during an idle mode, the switch $SW_8$ is opened by the switching signal $S_8$ to disconnect the reference voltage $I_{REF}$ from the sampling capacitor $C_S$. Additionally, the switches $SW_2$ and $SW_3$ can remain closed to provide zeroing of the transconductance amplifier 210, the switch $SW_5$ can be closed by the switching signal $S_5$ to provide zeroing of the sampling capacitor $C_S$, and the switch $SW_6$ can remain closed to latch the first comparison signal $CMP_1$ provided by the sampling comparator 224. The state machine 228 therefore can await a change in state of the second comparison signal $CMP_2$ to begin a next switching period.

Because the power supply circuit 200 provides switching times based on the amplitude of the input current $I_{IN}$ relative to the reference current $I_{REF}$ (e.g., based on the sampling voltage $V_{SMPL}$), the power supply circuit 200 can regulate the amplitude of the input current $I_{IN}$ in a manner that is more effective than input current regulation in a typical power supply circuit. For example, as described above, the current regulation of the power supply circuit 200 is implemented for more complex waveforms of the inductor current $I_L$, as well as non-zero initial amplitudes of the inductor current $I_L$, as opposed to being limited to triangular inductor current waveforms with an initial zero amplitude, as is the case for a typical power supply circuit. Additionally, the power supply circuit 200 provides real-time measurement of the input current $I_{IN}$ during each cycle of the switching voltage regulator 202, and thus an actual peak amplitude of the inductor current $I_L$, as opposed to regulating the input current based on a fixed peak current amplitude estimate as is provided in a typical power supply circuit. Furthermore, a typical power supply circuit requires multiple capacitors for comparing multiple charges (e.g., a charge transmitted from the input and a charge of a desired average input current) to perform input current regulation. The power supply circuit 200 includes only a single capacitor for current regulation (e.g., the sampling capacitor $C_S$), which can provide for a more compact circuit and remove the requirement for matching between two or more capacitors. Accordingly, the input current regulation provided by the power supply circuit 200 can be substantially more effective than input current regulation of a typical power supply circuit.

Figure 7:
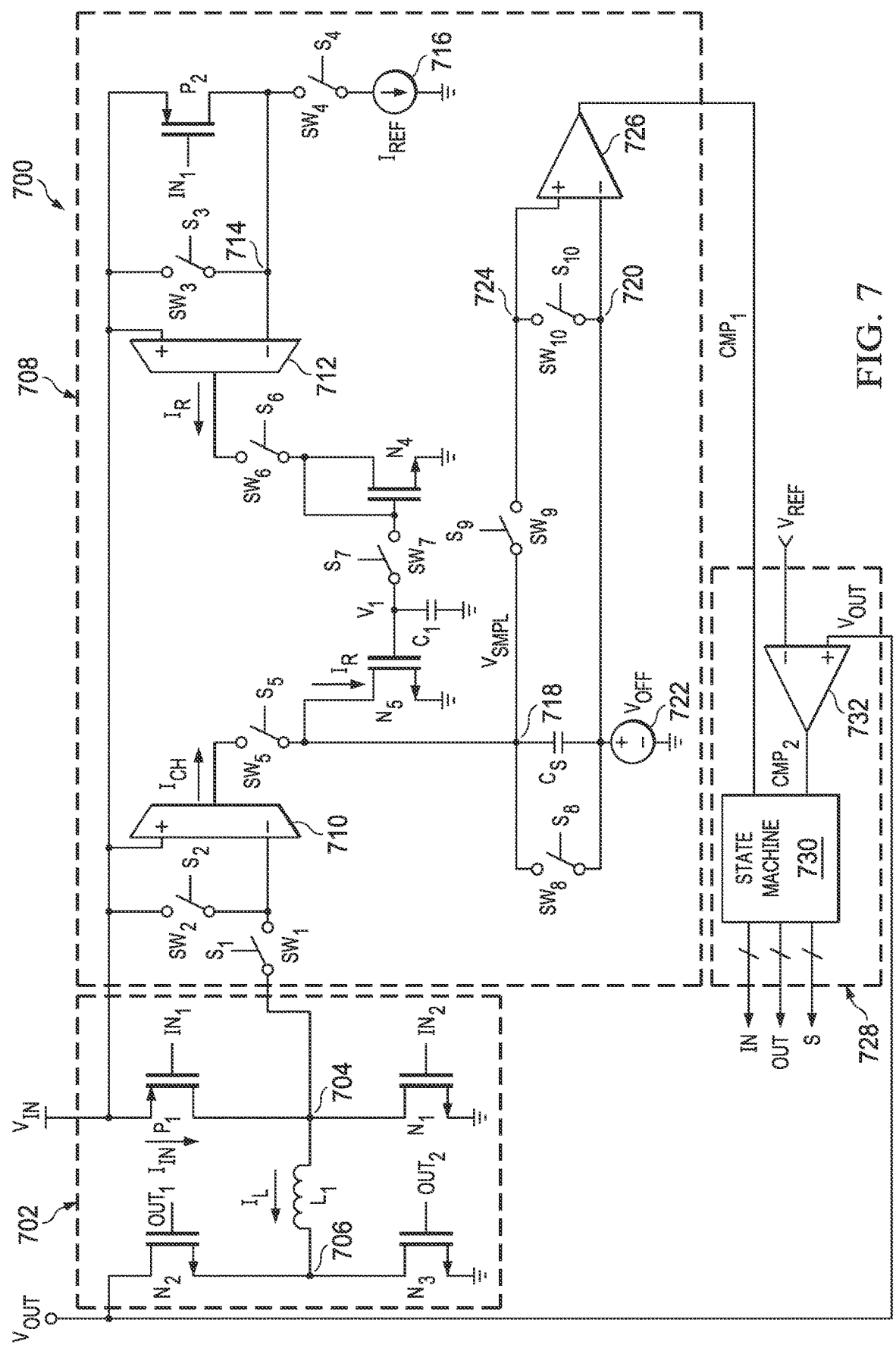
FIG. 7 is another example of a schematic electrical circuit diagram of a power supply circuit.

FIG. 7 is another example of a schematic electrical circuit diagram of a power supply circuit 700. The power supply circuit 700 can be implemented in any of a variety of wireless electronic devices, such as laptop computers, tablet computers, smart phones, or any of a variety of other electronic devices. The power supply circuit 700 is configured to generate an output voltage $V_{OUT}$ from an input voltage $V_{IN}$. The power supply circuit 700 can be the power supply system 100 in the example of FIG. 1. Therefore, the description of the example of FIG. 7 also refers to FIG. 1. The power supply circuit 700 in the example of FIG. 7 is provided as another example of the current regulation technique that implements an open-loop topology for a transconductance amplifier (as described in greater detail herein), as opposed to the closed-loop topology for the transconductance amplifier 210 in the example of FIG. 2. Therefore, the power supply circuit 700 need not require stability compensation resulting in support of a high slope of the inductor current $I_L$ based on a smaller inductance of the inductor $L_1$.

The power supply circuit 700 includes a switching voltage regulator 702. The switching voltage regulator 702 includes a high-side switch, shown as a PFET $P_1$, a low-side switch, shown as an NFET $N_1$, a first output switch, shown as an NFET $N_2$, and a second output switch, shown as an NFET $N_3$. The PFET $P_1$ interconnects the input voltage $V_{IN}$ at a source and a switching node 704 at a drain, and the NFET $N_1$ interconnects the switching node 704 at a drain and a low-voltage rail, shown in the example of FIG. 7 as ground, at a source. The NFET $N_2$ interconnects the output voltage $V_{OUT}$ at a drain and a switching node 706 at a source, and the NFET $N_3$ interconnects the switching node 706 at a drain and the low-voltage rail at a source. An inductor $L_1$ interconnects the switching nodes 704 and 706 and is configured to conduct a current $I_L$.

The PFET $P_1$ is controlled by a switching signal $IN_1$, the NFET $N_1$ is controlled by a switching signal $IN_2$, the NFET $N_2$ is controlled by a switching signal $OUT_1$, and the NFET $N_3$ is controlled by a switching signal $OUT_2$. The activation of the FETs $P_1$, $N_1$, $N_2$, and $N_3$ in a sequence provides the current $I_L$ through the inductor $L_1$ in switching phases defined by the switching signals $IN_1$, $IN_2$, $OUT_1$, and $OUT_2$, respectively. For example, the activation of the PFET $P_1$ provides the input current $I_{IN}$ to flow from the input voltage $V_{IN}$ to the switching node 704 during the first switching phase based on the switching signal $IN_1$, such that the current $I_L$ is approximately equal to the input current $I_{IN}$ during the first switching phase of the switching voltage regulator 702. During the second switching phase of the switching voltage regulator 702, the PFET $P_1$ is deactivated and the NFET $N_1$ is activated by the switching signal $IN_2$ to conduct the current $I_L$ from the low-voltage rail through the inductor $L_1$. Therefore, the switching voltage regulator 702 operates substantially the same as the switching voltage regulator 202 in the example of FIG. 2.

The power supply circuit 700 also includes a current regulator system 708 that is configured to regulate an amplitude of the input current $I_{IN}$. In the example of FIG. 7, the current regulator system 708 includes a first transconductance amplifier 710 that has a first input that is coupled to the switching node 704 through a first switch $SW_1$ controlled by a switching signal $S_1$ and to the input voltage $V_{IN}$ through a second switch $SW_2$ controlled by a switching signal $S_2$. The first transconductance amplifier 710 also has a second input that is coupled to the input voltage $V_{IN}$. The current regulator system 708 also includes a second transconductance amplifier 712 that has a first input that is coupled to a node 714 and to the input voltage $V_{IN}$ through a switch $SW_3$ controlled by a switching signal $S_3$. The first and second transconductance amplifiers 710 and 712 can be fabricated approximately identically, and can therefore have an approximately equal transconductance (GM) factor. The second transconductance amplifier 712 also has a second input that is coupled to the input voltage $V_{IN}$. The node 714 is coupled to the input voltage $V_{IN}$ through a PFET $P_2$. As an example, the PFET $P_2$ is a replica switch with respect to the PFET $P_1$, such that the PFET $P_2$ has a channel width that is scaled-down by a factor of K relative to the PFET $P_1$.

In the example of FIG. 7, the PFET $P_2$ is activated by the switching signal $IN_1$, such that the PFET $P_2$ is activated concurrently with the PFET $P_1$ to conduct the reference current $I_{REF}$ that is generated from a current source 716 through a switch $SW_4$ that is controlled by a switching signal $S_4$. The current source 716 can be the reference current generator 108 in the example of FIG. 1. For example, the current source 716 is provided at an external pin of the associated IC on which the power supply circuit 700 is fabricated (e.g., as a grounded resistor). Therefore, when the switch $SW_4$ is closed, the current source 716 is configured to conduct the reference current $I_{REF}$ from the input voltage $V_{IN}$ and through the PFET $P_2$. As described above, the reference current $I_{REF}$ has an amplitude that is proportional to a maximum average amplitude setpoint of the input current $I_{IN}$ of the switching voltage regulator 702. For example, the proportionality of the reference current $I_{REF}$ to the maximum average amplitude setpoint of the input current $I_{IN}$ (expressed as $I_{TAR}$) is likewise scaled by the factor of K, as provided above in Equation 1.

The first transconductance amplifier 710 is configured to generate a charging current $I_{CH}$ that is provided to a sampling node 718 through a switch $SW_5$ controlled by a switching signal $S_5$. For example, the charging current $I_{CH}$ has an amplitude that is expressed as follows:

$$I_{CH}=GM*I_{IN}*R_{DSON} \quad \text{Equation 2}$$

Where: GM is the transconductance of the first transconductance amplifier 710; $R_{DSON}$ is the activation resistance of the PFET $P_1$.

Additionally, the second transconductance amplifier 712 is configured to generate a current $I_R$ that is provided through a switch $SW_6$ that is controlled by a switching signal $S_6$ and through a diode-connected NFET $N_4$. As an example, in the example of FIG. 7, the current IR has an amplitude that is expressed as follows:

$$I_R=GM*I_{TAR}*K*R_{DSON} \quad \text{Equation 3}$$

Where: GM is the transconductance of the second transconductance amplifier 712, which is approximately equal to the transconductance of the first transconductance amplifier 710;
$K*R_{DSON}$ is the activation resistance of the PFET $P_2$, which is approximately equal to K-times the activation resistance of the PFET $P_1$.

The diode-connected NFET $N_4$ has a gate and drain that are coupled to a sample and hold capacitor $C_1$ and a gate of an NFET $N_5$ through a switch $SW_7$ that is controlled by a switching signal $S_7$. Therefore, the NFETs $N_4$ and $N_5$ are arranged as a current mirror, with the current $I_R$ being provided to the capacitor $C_1$ when the switch $SW_7$ is closed to charge the capacitor $C_1$. The voltage $V_1$ on the capacitor $C_1$ thus provides an activation voltage for the NFET $N_5$ to mirror the current IR through the NFET $N_5$. Therefore, the NFET $N_5$ likewise conducts the current $I_R$.

Similar to the power supply circuit 200, the sampling node 718 is coupled to a sampling capacitor $C_S$ and has a sampling voltage $V_{SMPL}$. The sampling capacitor $C_S$ interconnects the sampling node 718 and a node 720. The sampling node 718 and the node 720 are also coupled by a switch $SW_8$ that is controlled by a switching signal $S_8$. A voltage source 722 provides an offset voltage $V_{OFF}$ to the node 720. Additionally, a switch $SW_9$ that is controlled by a switching signal $S_9$ interconnects the sampling node 718 and a node 724, and a switch $SW_{10}$ that is controlled by a switching signal $S_{10}$ interconnects the nodes 720 and 724. In the example of FIG. 7, the NFET $N_5$ is coupled to the sampling node 718 at a drain. Therefore, the NFET $N_5$ is configured to conduct the current IR from the sampling node 718, and thus from the sampling capacitor $C_S$. For example, the offset voltage VOFF (e.g., approximately 350 mV) provides sufficient headroom for the current $I_R$.

The current regulator system 708 includes a sampling comparator 726 that has inputs at the nodes 724 and 720. Therefore, the sampling comparator 726 is configured to monitor the sampling voltage $V_{SMPL}$ on the sampling capacitor $C_S$ when the switch $SW_9$ is closed (e.g., based on common mode operation defined by the offset voltage $V_{OFF}$). The sampling comparator 726 can generate a first comparison signal $CMP_1$ responsive to determining that the sampling voltage $V_{SMPL}$ has an amplitude of approximately zero.

The power supply circuit 700 further includes a switch controller 728 that includes a state machine 730. The first comparison signal $CMP_1$ is provided to the state machine 730 that also receives a second comparison signal $CMP_2$ from a reference comparator 732. In the example of FIG. 7, the reference comparator 732 is configured to compare the output voltage $V_{OUT}$ with a fixed reference voltage $V_{REF}$. Based on the comparison signals $CMP_1$ and $CMP_2$, the state machine 730 can generate the switching signals IN, OUT, and S that are provided to the respective PFETs $P_1$ through $P_3$, the NFETs $N_1$ through $N_3$, and the switches $SW_1$ through $SW_{10}$, respectively. Therefore, the state machine 730 can define the first and second switching phases of the switching voltage regulator 702, and therefore the switching period of the switching voltage regulator 702. The state machine 730 can also provide the controls for operating the switches $SW_1$ through $SW_{10}$ to provide the operation of the current regulator system 708 in each of the first and second switching phases to regulate the amplitude of the input current $I_{IN}$.

The power supply circuit 700 is not limited to the example shown in FIG. 7. For example, the switching voltage regulator 702 is not limited to the arrangement of the high and low-side switches $P_1$, $N_1$, $N_2$, and $N_3$. As one example, the PFET $P_1$, and by extension the replica PFET $P_2$, is arranged as N-channel transistors instead.

Figure 8:
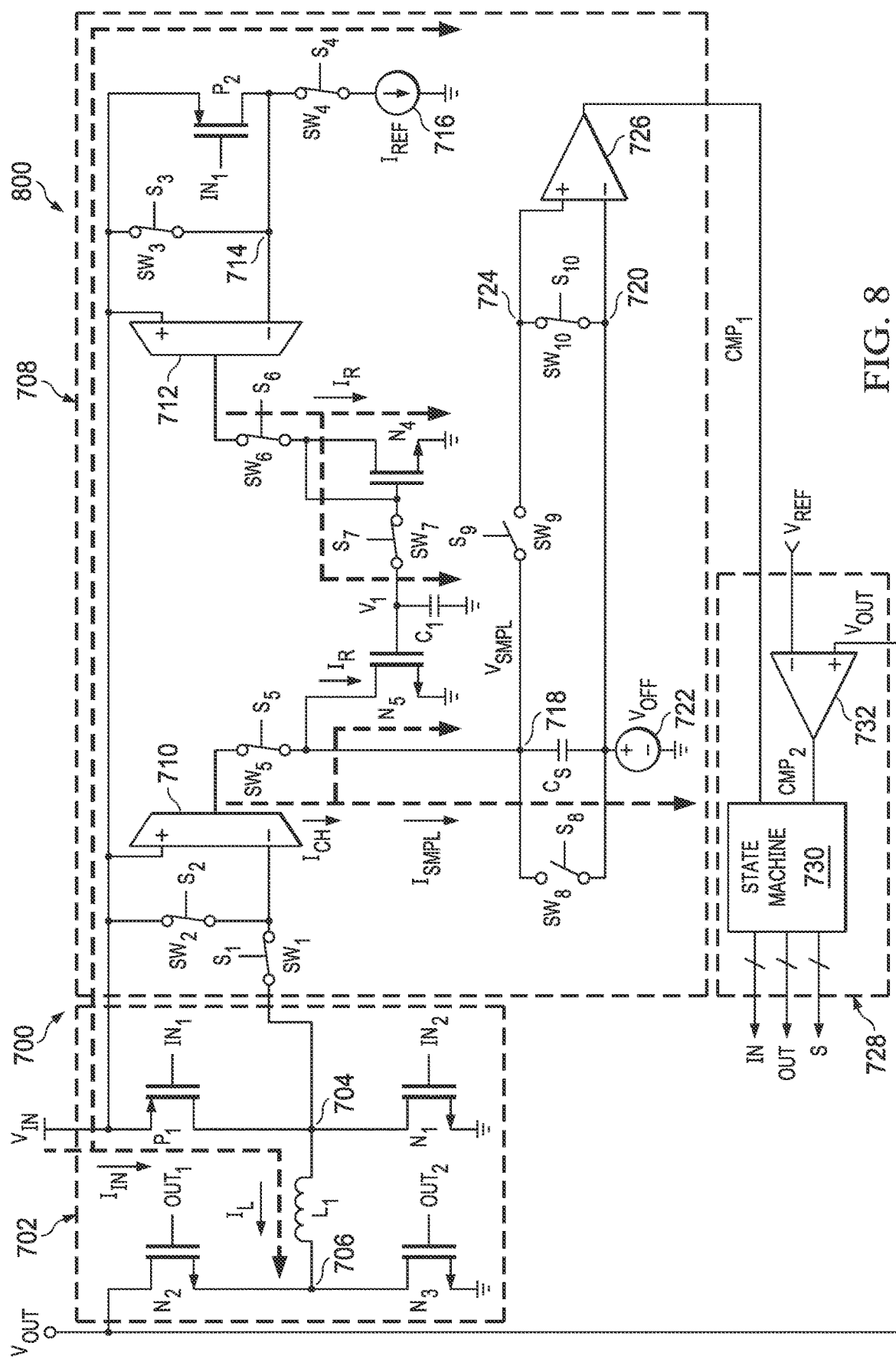
FIG. 8 is another example of a schematic electrical circuit diagram of current flow in a power supply circuit.
Figure 9:
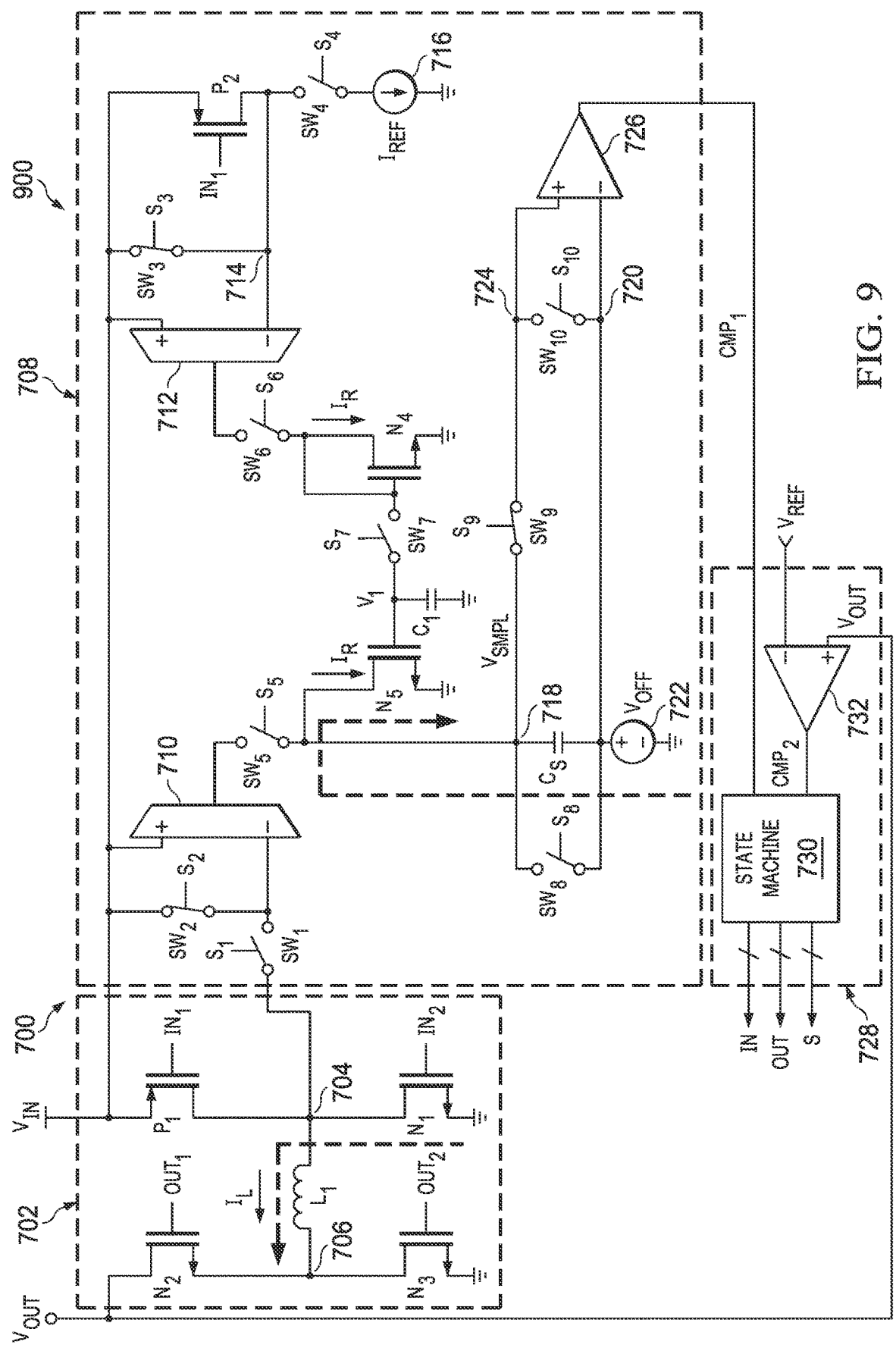
FIG. 9 is another example of a schematic electrical circuit diagram of current flow in a power supply circuit.

Operation of the power supply circuit 700 is shown in greater detail in FIGS. 4, 8, and 9. FIG. 8 is another example of a schematic electrical circuit diagram 800 of current flow in the power supply circuit 700 in the first switching phase of the switching voltage regulator 702, and FIG. 9 is another example of a schematic electrical circuit diagram 900 of current flow in the power supply circuit 700 in the second switching phase of the switching voltage regulator 702. Accordingly, the following description also refers to the examples of FIGS. 4, 8, and 9.

In the first timing diagram 402, the switching voltage regulator 702 begins the first switching phase at a time $T_0$. At the time $T_0$, the PFET $P_1$ and the NFET $N_3$ are activated by the switching signals $IN_1$ and $OUT_2$, respectively. Additionally, with reference to the example of FIG. 8, the switches $SW_1$, $SW_4$, $SW_5$, $SW_6$, $SW_7$, and $SW_{10}$ are closed by the switching signals $S_1$, $S_4$, $S_5$, $S_6$, $S_7$, and $S_{10}$, respectively. Therefore, the input current $I_{IN}$ flows from the input voltage $V_{IN}$, through the PFET $P_1$, and through the inductor $L_1$ as the current $I_L$, and through the NFET $N_3$. Thus, in the example of FIG. 4, the current $I_L$ is demonstrated as increasing from an amplitude $I_{L0}$ to an amplitude $I_{L1}$.

At the time $T_1$, the NFET $N_3$ is deactivated by the switching signal $OUT_2$ and the NFET $N_2$ is activated by the switching signal $OUT_1$. Therefore, the input current $I_{IN}$ flows from the input voltage $V_{IN}$, through the PFET $P_1$, and through the inductor $L_1$ as the current $I_L$, and through the NFET $N_2$. Thus, the current $I_L$ continues to increase in amplitude from the time $T_1$ to the time $T_2$ during the first switching phase of the switching voltage regulator 702. Additionally, with further reference to the example of FIG. 8, during the first switching phase defined between the times $T_0$ and $T_2$, the input current $I_{IN}$ flows through the PFET $P_1$ and the reference current flows through the PFET $P_2$ based on the matched PFETs $P_1$ and $P_2$ concurrently activated by the switching signal $IN_1$. The first transconductance amplifier 710 generates the charging current $I_{CH}$ based on the input current $I_{IN}$ and having an amplitude defined by Equation 2 above based on the closure of the switch $SW_1$. Similarly, the second transconductance amplifier 712 generates the current $I_R$ based on the reference current and having an amplitude defined by Equation 3 above based on the closure of the switch $SW_4$.

Based on the closure of the switch $SW_5$, the charging current $I_{CH}$ is provided from the first transconductance amplifier 710 to the sampling node 718. Based on the closure of the switch $SW_6$, the current $I_R$ is provided from the second transconductance amplifier 712 through the NFET $N_4$. The current $I_R$ charges the capacitor $C_1$ to provide the voltage $V_1$ at the gate of the NFET $N_5$, and the current $I_R$ is mirrored from the NFET $N_4$ to the NFET $N_5$. As a result, a sampling current $I_{SMPL}$ is provided through the sampling capacitor $C_S$. The current $I_{SMPL}$ therefore has an amplitude that is equal to the charging current $I_{CH}$ minus the current $I_R$. Thus, the sampling current $I_{SMPL}$ begins charging the sampling capacitor $C_S$ to increase the amplitude of the sampling voltage $V_{SMPL}$. Because the switch $SW_9$ is open and the switch $SW_{10}$ is closed during the first switching phase of the switching voltage regulator 702, the sampling comparator 726 is not monitoring the sampling voltage $V_{SMPL}$. Therefore, the first comparison signal $CMP_1$ is asserted at a logic-high state.

Referring back to the example of FIG. 4, the switching voltage regulator 702 switches from the first switching phase to the second switching phase at the time $T_2$. At the time $T_2$, the PFET $P_1$ is deactivated and the NFET $N_1$ is activated by the switching signals $IN_1$ and $IN_2$, respectively, and the NFET $N_2$ remains activated. Additionally, with reference to the example of FIG. 9, the switches $SW_1$, $SW_4$, $SW_5$, $SW_6$, $SW_7$, and $SW_{10}$ are opened by the switching signals $S_1$, $S_4$, $S_5$, $S_6$, $S_7$, and $S_{10}$, respectively, and the switches $SW_2$, $SW_3$, and $SW_9$ are closed by the switching signals $S_2$, $S_3$, and $S_9$, respectively. Therefore, the input current $I_{IN}$ ceases, and the current $I_L$ flows from the low-voltage rail, through the NFET $N_1$, through the inductor $L_1$, and through the NFET $N_2$. Thus, in the example of FIG. 4, the current $I_L$ is demonstrated as decreasing from the amplitude $I_{L2}$ to an amplitude $I_{L3}$ at a time $T_3$. At the time $T_3$, the NFET $N_2$ is deactivated by the switching signal $OUT_1$ and the NFET $N_3$ is activated by the switching signal $OUT_2$. Therefore, the current $I_L$ flows from the low-voltage rail, through the NFET $N_1$, through the inductor $L_1$, and through the NFET $N_3$. Thus, in the example of FIG. 4, the current $I_L$ is demonstrated as decreasing from the amplitude $I_{L3}$ to the initial $I_{L0}$ at a time $T_4$.

With reference to the example of FIG. 9, in the second switching phase of the switching voltage regulator 702, the PFETs $P_1$ and $P_2$ are both deactivated, which ceases the flow of the input current $I_{IN}$, and by extension, the reference current $I_{REF}$. The switches $SW_2$ and $SW_3$ are closed to provide zeroing of the first and second transconductance amplifiers 710 and 712. Because the charging current $I_{CH}$ ceases to flow from the first transconductance amplifier 710, the charging current $I_{CH}$ is no longer provided to the sampling node 718. Similarly, the current $I_R$ ceases to flow from the second transconductance amplifier 712. However, the sampled voltage $V_1$ across the capacitor $C_1$ continues to provide activation of the NFET $N_5$ in the second switching phase of the switching voltage regulator 702, resulting in the current $I_R$ continuing to draw charge from the sampling capacitor $C_S$. As a result, the sampling voltage $V_{SMPL}$ decreases beginning at the time $T_2$ during the second switching phase of the switching voltage regulator 702.

Due to the closure of the switch $SW_9$, the sampling comparator 726 compares the sampling voltage $V_{SMPL}$ at the sampling node 718 with the voltage at the node 720, and therefore monitors the voltage across the sampling capacitor $C_S$. Responsive to the sampling voltage $V_{SMPL}$ having an amplitude of approximately zero, and thus the sampling capacitor $C_S$ has approximately zero charge, the sampling comparator 726 can de-assert the first comparison signal $CMP_1$. Responsive to the de-assertion of the first comparison signal $CMP_1$, and responsive to a logic-low amplitude of the second comparison signal $CMP_2$ as provided by the reference comparator 732 (e.g., responsive to the reference voltage $V_{REF}$ being greater than the output voltage $V_{OUT}$), the state machine 730 can change the state of the switching signals IN, OUT, and S. Therefore, the state machine 730 can switch the switching voltage regulator 702 from the second switching phase to the first switching phase, and thus the beginning of a next switching period. Therefore, the state machine 730 can dictate the time duration of the switching periods of the switching voltage regulator 702 based on the amplitude of the input current $I_{IN}$ relative to the reference current $I_{REF}$ (e.g., based on the sampling voltage $V_{SMPL}$) to regulate the amplitude of the input current $I_{IN}$.

Similar to as described above, upon completion of a switching period, the state machine 730 can implement an idle (e.g., sleep) mode for the power supply circuit 700, such as based on a deactivation mode for the power supply circuit 700 or for a discontinuous mode of operation for the switching voltage regulator 702. For example, during an idle mode, the switches $SW_2$ and $SW_3$ remains closed to provide zeroing of the transconductance amplifiers 710 and 712, the switch $SW_8$ is closed by the switching signal $S_8$ to provide zeroing of the sampling capacitor $C_S$, and the switch $SW_9$ remains closed to provide zeroing of the sampling comparator 726. The state machine 730 therefore can await a change in state of the second comparison signal $CMP_2$ to begin a next switching period.

Figure 10:
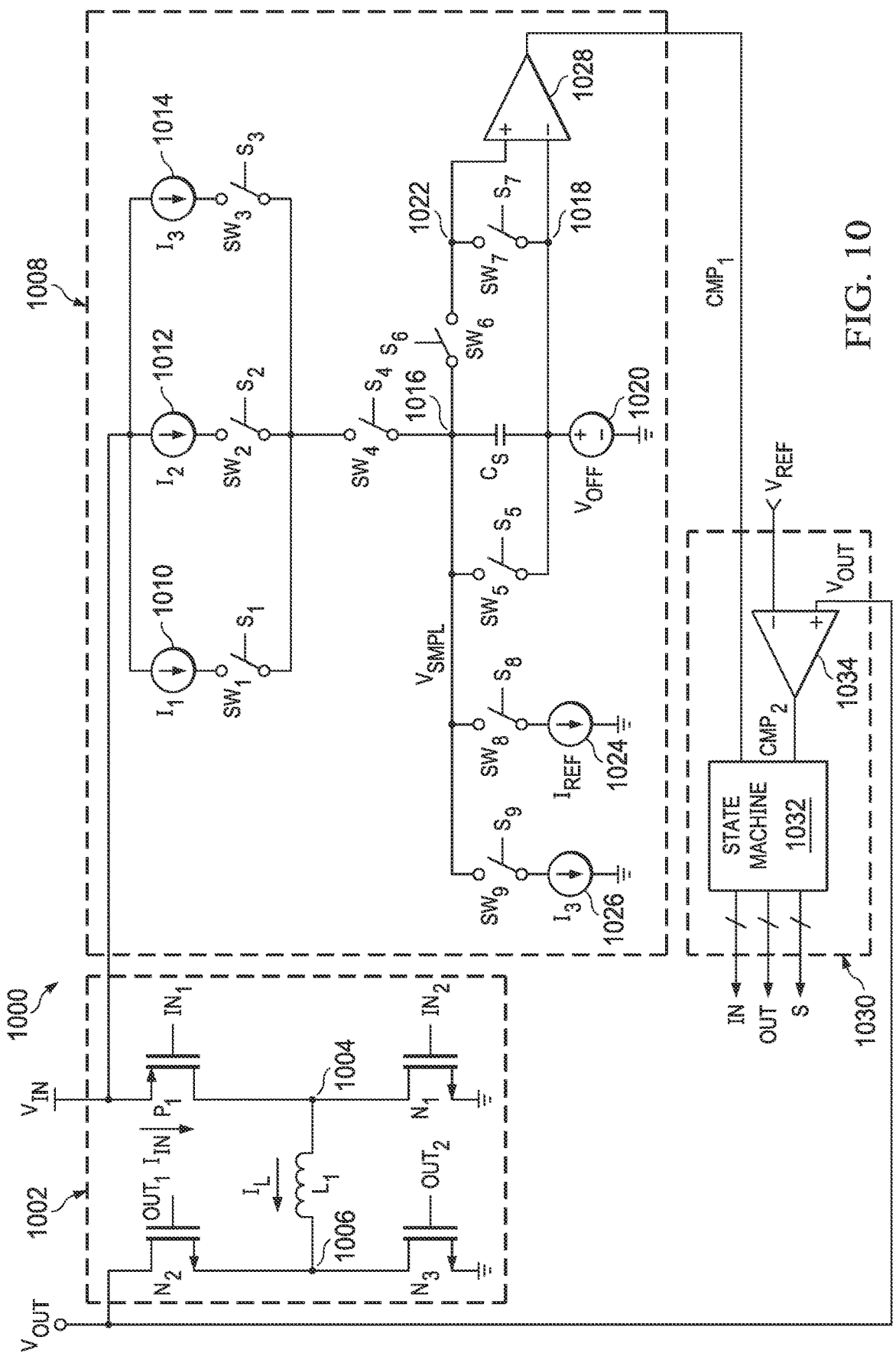
FIG. 10 is another example of a schematic electrical circuit diagram of current flow in a power supply circuit.

FIG. 10 is another example of a schematic electrical circuit diagram showing current flow in a power supply circuit 1000. The power supply circuit 1000 can be implemented in any of a variety of wireless electronic devices, such as laptop computers, tablet computers, smart phones, or any of a variety of other electronic devices. The power supply circuit 1000 is configured to generate an output voltage $V_{OUT}$ from an input voltage $V_{IN}$. The power supply circuit 1000 can be the power supply system 100 in the example of FIG. 1. Therefore, the description of FIG. 10 also refers to FIG. 1. The power supply circuit 1000 in the example of FIG. 10 provides another example of the current regulation technique that implements estimated values for the peak and valley amplitudes of the inductor current $I_L$. For example, the estimates for the peak and valley amplitudes of the inductor current $I_L$ is calculated in any of a variety of ways, such as the operating modes of the power supply circuit 1000, the relative amplitudes of the input voltage $V_{IN}$ and the output voltage $V_{OUT}$, duty-cycles, factory testing/calibration, or any of a variety of methods.

The power supply circuit 1000 includes a switching voltage regulator 1002. The switching voltage regulator 1002 includes a high-side switch, shown as a PFET $P_1$, a low-side switch, shown as an NFET $N_1$, a first output switch, shown as an NFET $N_2$, and a second output switch, shown as an NFET $N_3$. The PFET $P_1$ interconnects the input voltage $V_{IN}$ at a source and a switching node 1004 at a drain, and the NFET $N_1$ interconnects the switching node 1004 at a drain and a low-voltage rail, shown in the example of FIG. 10 as ground, at a source. The NFET $N_2$ interconnects the output voltage $V_{OUT}$ at a drain and a switching node 1006 at a source, and the NFET $N_3$ interconnects the switching node 1006 at a drain and the low-voltage rail at a source. An inductor $L_1$ interconnects the switching nodes 1004 and 1006 and is configured to conduct a current $I_L$.

The PFET $P_1$ is controlled by a switching signal $IN_1$, the NFET $N_1$ is controlled by a switching signal $IN_2$, the NFET $N_2$ is controlled by a switching signal $OUT_1$, and the NFET $N_3$ is controlled by a switching signal $OUT_2$. The activation of the FETs $P_1$, $N_1$, $N_2$, and $N_3$ in a sequence provides the current $I_L$ through the inductor $L_1$ in switching phases defined by the switching signals $IN_1$, $IN_2$, $OUT_1$, and $OUT_2$, respectively. For example, the activation of the PFET $P_1$ provides the input current $I_{IN}$ to flow from the input voltage $V_{IN}$ to the switching node 1004 during the first switching phase based on the switching signal $IN_1$, such that the current $I_L$ is approximately equal to the input current $I_{IN}$ during the first switching phase of the switching voltage regulator 1002. During the second switching phase of the switching voltage regulator 1002, the PFET $P_1$ is deactivated and the NFET $N_1$ is activated by the switching signal $IN_2$ to conduct the current $I_L$ from the low-voltage rail through the inductor $L_1$. Therefore, the switching voltage regulator 1002 operates substantially the same as the switching voltage regulator 202 in the example of FIG. 2.

The power supply circuit 1000 also includes a current regulator system 1008 that is configured to regulate an amplitude of the input current $I_{IN}$. In the example of FIG. 10, the current regulator system 1008 includes a first current source 1010 that generates a first current $I_1$, a second current source 1012 that generates a second current $I_2$, and a third current source 1014 that generates a third current $I_3$. As an example, the currents $I_1$, $I_2$, and $I_3$, in combination, are the charging current $I_{CH}$ during the first switching phase, as described in greater detail herein. The first current source 1010 interconnects the input voltage $V_{IN}$ and a switch $SW_1$ that is controlled by a switching signal $S_1$, the second current source 1012 interconnects the input voltage $V_{IN}$ and a switch $SW_2$ that is controlled by a switching signal $S_2$, and the third current source 1014 interconnects the input voltage $V_{IN}$ and a switch $SW_3$ that is controlled by a first switching signal $S_3$. The parallel arrangements of the current source 1010 and the switch $SW_1$, the current source 1012 and the switch $SW_2$, and the current source 1014 and the switch $SW_3$ are arranged in series with a switch $SW_4$ that is controlled by a switching signal $S_4$.

The switch $SW_4$ is coupled to a sampling node 1016. A sampling capacitor $C_S$ interconnects the sampling node 1016 and a node 1018. The sampling node 1016 and the node 1018 are also coupled by a switch $SW_5$ that is controlled by a switching signal $S_5$. A voltage source 1020 provides an offset voltage $V_{OFF}$ to the node 1018. Additionally, a switch $SW_6$ that is controlled by a switching signal $S_6$ interconnects the sampling node 1016 and a node 1022, and a switch $SW_7$ that is controlled by a switching signal $S_7$ interconnects the nodes 1018 and 1022.

The current regulator system 1008 also includes a current source 1024 that is coupled to the sampling node 1016 through a switch $SW_8$ that is controlled by a switching signal $S_8$. The current source 1024 can be the reference current generator 108 in the example of FIG. 1. For example, the current source 1024 is provided at an external pin of the associated IC on which the power supply circuit 1000 is fabricated (e.g., as a grounded resistor). Therefore, when the switch $SW_8$ is closed, the current source 1024 is configured to conduct the reference current $I_{REF}$ from the sampling node 1016, and thus from the sampling capacitor $C_S$. For example, the offset voltage $V_{OFF}$ (e.g., approximately 350 mV) provides sufficient headroom for the reference current $I_{REF}$. As described above, the reference current $I_{REF}$ can have an amplitude that is proportional to a maximum average amplitude setpoint of the input current $I_{IN}$ of the switching voltage regulator 1002. For example, the proportionality of the reference current $I_{REF}$ to the maximum average amplitude setpoint of the input current $I_{IN}$ (expressed as $I_{TAR}$) is likewise scaled by the factor of K, as provided above in Equation 1. In addition, the current regulator system 1008 includes a current source 1026 that is coupled to the sampling node 1016 through a switch $SW_9$ that is controlled by a switching signal $S_9$. The current source 1026 generates the current $I_3$, which is approximately equal to the current $I_3$ generated by the current source 1014 described above.

The switching voltage regulator 1008 includes a sampling comparator 1028 that has inputs at the nodes 1018 and 1022. The sampling comparator 1028 is therefore configured to monitor the sampling voltage $V_{SMPL}$ on the sampling capacitor $C_S$ when the switch $SW_6$ is closed (e.g., based on common mode operation defined by the offset voltage $V_{OFF}$). The sampling comparator 1028 can generate a first comparison signal $CMP_1$ responsive to determining that the sampling voltage $V_{SMPL}$ has an amplitude of approximately zero.

The power supply circuit 1000 further includes a switch controller 1030 that includes a state machine 1032. The first comparison signal $CMP_1$ is provided to the state machine 1032 that also receives a second comparison signal $CMP_2$ from a reference comparator 1034. In the example of FIG. 10, the reference comparator 1034 is configured to compare the output voltage $V_{OUT}$ with a fixed reference voltage $V_{REF}$. Based on the comparison signals $CMP_1$ and $CMP_2$, the state machine 1032 can generate the switching signals IN, OUT, and S that are provided to the respective PFET $P_1$, the NFETs $N_1$ through $N_3$, and the switches $SW_1$ through $SW_9$, respectively. Therefore, the state machine 1032 can define the first and second switching phases of the switching voltage regulator 1002, and therefore the switching period of the switching voltage regulator 1002. The state machine 1032 can also provide the controls for operating the switches $SW_1$ through $SW_9$ to provide the operation of the current regulator system 1008 in each of the first and second switching phases to regulate the amplitude of the input current $I_{IN}$.

The power supply circuit 1000 is not limited to the circuit shown FIG. 10. For example, the switching voltage regulator 1002 is not limited to the arrangement of the high and low-side switches $P_1$, $N_1$, $N_2$, and $N_3$. As one example, the PFET $P_1$ is arranged as an N-channel transistor instead.

Figure 11:
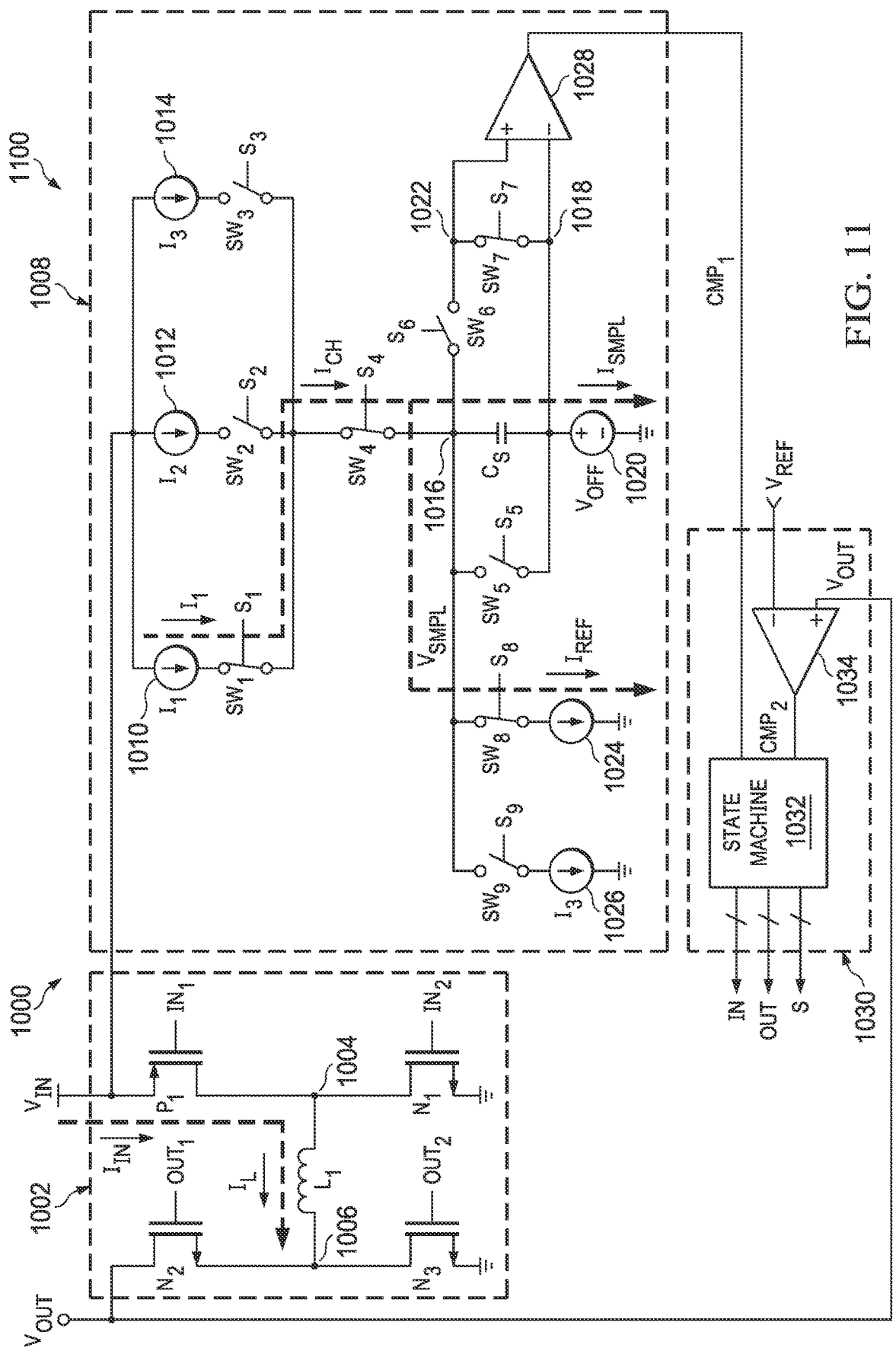
FIG. 11 is another example of a schematic electrical circuit diagram of current flow in a power supply circuit.
Figure 12:
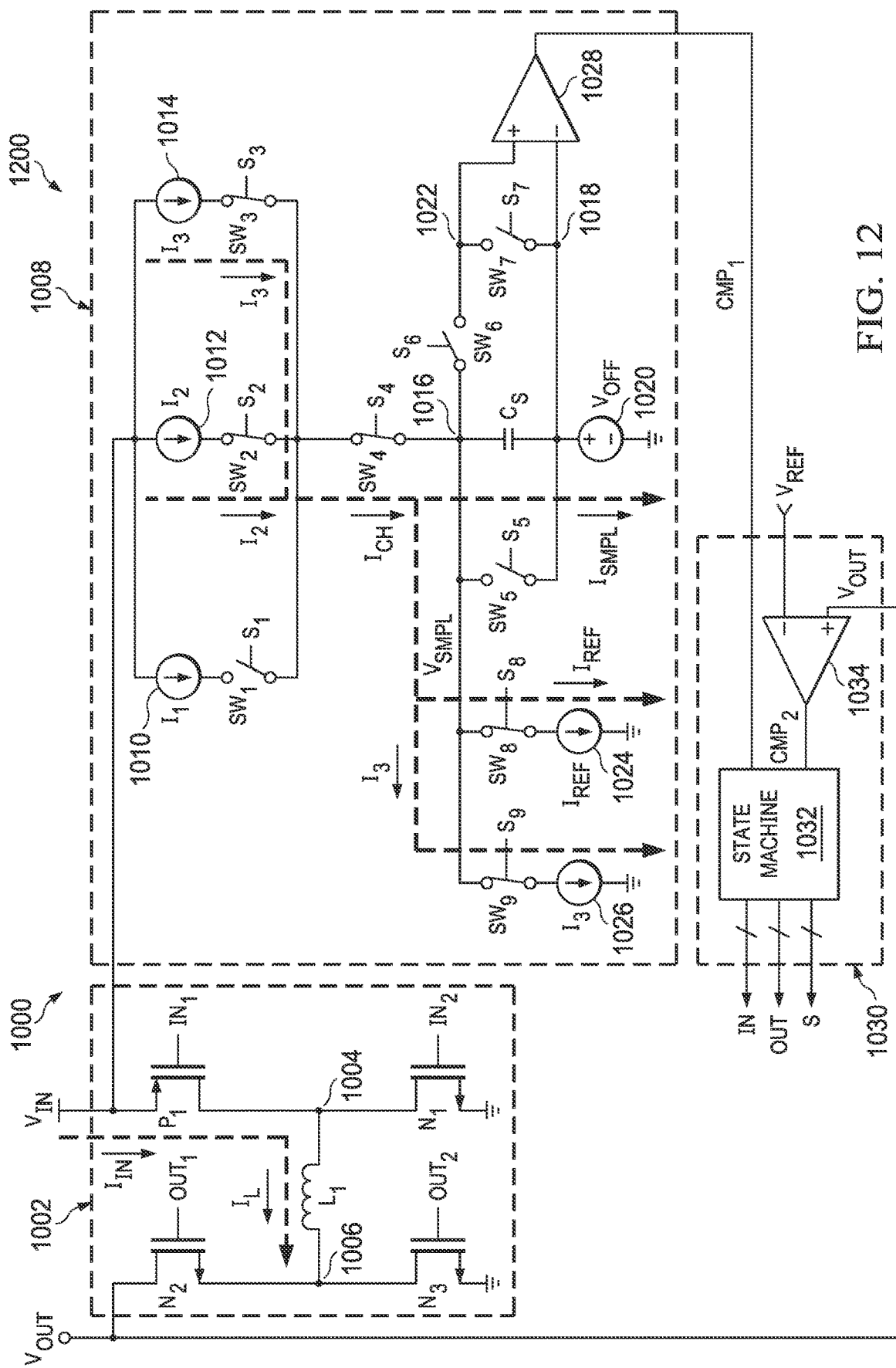
FIG. 12 is another example of a schematic electrical circuit diagram of current flow in a power supply circuit.
Figure 13:
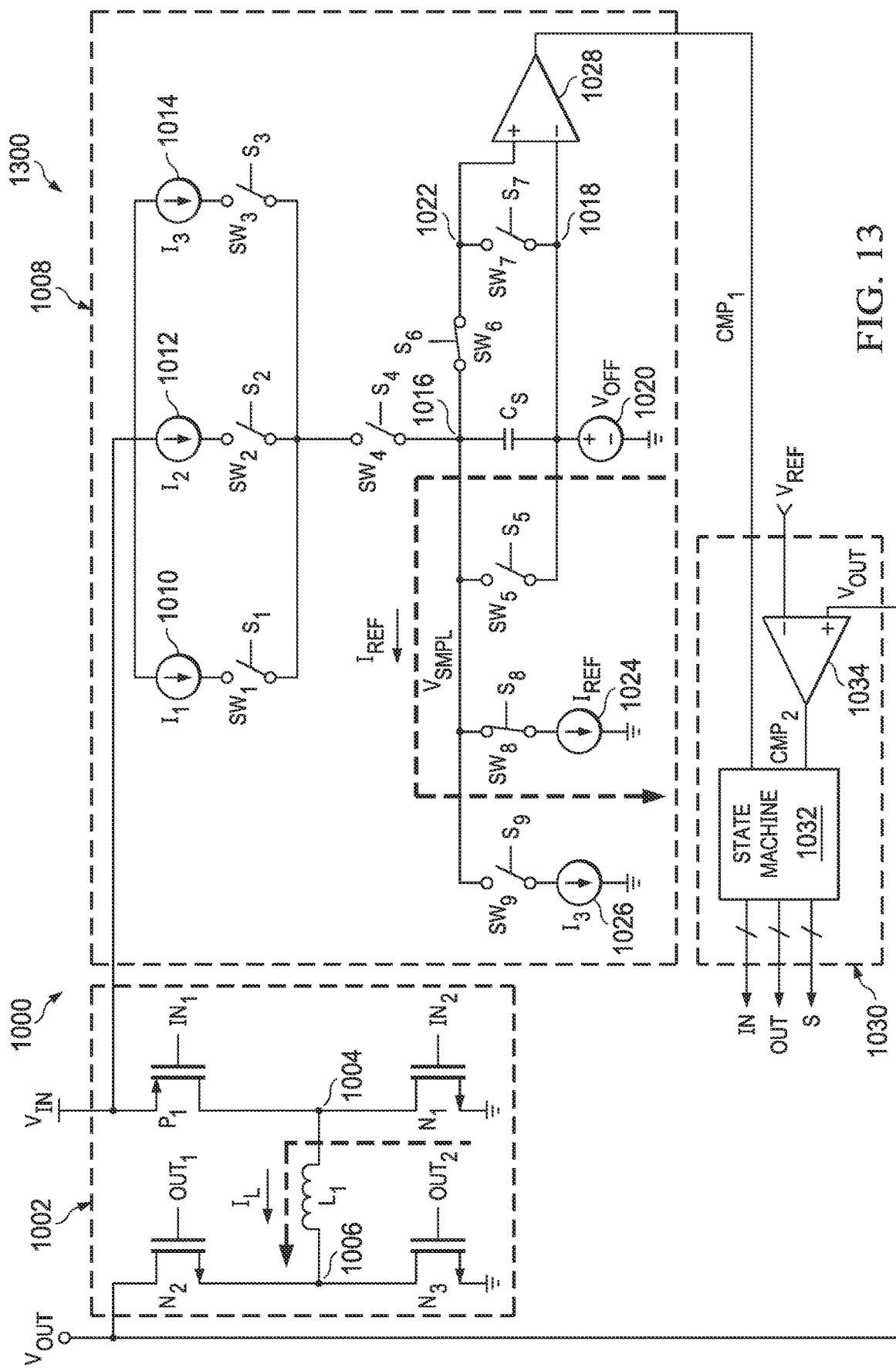
FIG. 13 is another example of a schematic electrical circuit diagram of current flow in a power supply circuit.

Operation of the power supply circuit 1000 is shown in greater detail in FIGS. 4 and 11-13. FIG. 11 is another example of a schematic electrical circuit diagram 1100 of current flow in the power supply circuit 1000 in the first switching phase of the switching voltage regulator 1002, FIG. 12 is another example of a schematic electrical circuit diagram 1200 of current flow in the power supply circuit 1000 in the first switching phase of the switching voltage regulator 1002, and FIG. 13 is another example of a schematic electrical circuit diagram 1300 of current flow in the power supply circuit 1000 in the second switching phase of the switching voltage regulator 1002. Accordingly, the description of FIG. 11 also refers to the examples of FIGS. 4 and 11-13.

In the first timing diagram 402, the switching voltage regulator 1002 begins the first switching phase at a time $T_0$. At the time $T_0$, the PFET $P_1$ and the NFET $N_3$ are activated by the switching signals $IN_1$ and $OUT_2$, respectively. Therefore, the input current $I_{IN}$ flows from the input voltage $V_{IN}$, through the PFET $P_1$, and through the inductor $L_1$ as the current $I_L$, and through the NFET $N_3$. Thus, in the example of FIG. 4, the current $I_L$ is demonstrated as increasing from an amplitude of $I_{L0}$ to an amplitude $I_{L1}$.

Additionally, with reference to the example of FIG. 11, the switches $SW_1$, $SW_4$, $SW_7$, and $SW_8$ are closed by the switching signals $S_1$, $S_4$, $S_7$, and $S_8$, respectively, from the time $T_0$ to the time $T_1$. Therefore, from the time $T_0$ and $T_1$, the current $I_1$ flows from the current source 1010, through the closed switches $SW_1$ and $SW_4$, and to the sampling node 1016. While the current $I_1$ is provided to the sampling node 1016, based on the closure of the switch $SW_8$, the reference current $I_{REF}$ flows from the sampling node 1016. As a result, a sampling current $I_{SMPL}$ is provided through the sampling capacitor $C_S$. The current $I_{SMPL}$ therefore has an amplitude that is equal to the current $I_1$ minus the reference current $I_{REF}$. Thus, the sampling current $I_{SMPL}$ begins charging the sampling capacitor $C_S$ to increase the amplitude of the sampling voltage $V_{SMPL}$ from the time $T_0$ to the time $T_1$. Because the switch $SW_6$ is open and the switch $SW_7$ is closed during the first switching phase of the switching voltage regulator 1002, the sampling comparator 1028 is not monitoring the sampling voltage $V_{SMPL}$. Therefore, the first comparison signal $CMP_1$ is asserted at a logic-high state.

Referring to the example of FIG. 4, at the time $T_1$, the NFET $N_3$ is deactivated by the switching signal $OUT_2$ and the NFET $N_2$ is activated by the switching signal $OUT_1$. Therefore, the input current $I_{IN}$ flows from the input voltage $V_{IN}$, through the PFET $P_1$, and through the inductor $L_1$ as the current $I_L$, and through the NFET $N_2$. Thus, the current $I_L$ continues to increase in amplitude from the time $T_1$ to the time $T_2$ during the first switching phase of the switching voltage regulator 1002. Additionally, with reference to the example of FIG. 12, the switch $SW_1$ is opened by the switching signal $S_1$, the switches $SW_4$, $SW_7$, and $SW_8$ remain closed, the switch $SW_2$ is closed by the switching signal $S_2$, and one of the switches $SW_3$ and $SW_9$ is closed by the respective one of the switching signals $S_3$ and $S_9$, depending on the operational mode of the switching voltage regulator 1002.

For example, for the buck mode operation of the timing diagram 402 (and the timing diagram 302 in the example of FIG. 3), the switch $SW_3$ is closed. However, for the boost mode operation shown in the timing diagram 304 in the example of FIG. 3, the switch $SW_9$ is closed instead. Therefore, the amplitude of the current $I_3$ is added to the amplitude of the current $I_2$ at the sampling node 1016 for a buck mode of operation, or the amplitude of the current $I_3$ is subtracted from the amplitude of the current $I_2$ in the boost mode of operation. While the example of FIG. 12 shows both switches $SW_3$ and $SW_9$ as being concurrently closed, only one of the switches $SW_3$ and $SW_9$ is closed at a given time, depending on the operational mode of the switching voltage regulator 1002. Therefore, the current $I_1$ can be the charging current $I_{CH}$ that is provided to the sampling node 1016 from the time $T_0$ to the time $T_1$, and the combination of the currents $I_2$ and $I_3$ (additive or subtractive) can be the charging current $I_{CH}$ that is provided to the sampling node 1016 from the time $T_1$ to the time $T_2$.

Based on the closure of the switch $SW_4$, the charging current $I_{CH}$ is provided to the sampling node 1016 during the first switching phase of the switching voltage regulator 1002. While the charging current $I_{CH}$ is provided to the sampling node 1016, based on the closure of the switch $SW_8$, the reference current $I_{REF}$ flows from the sampling node 1016. As a result, a sampling current $I_{SMPL}$ is provided through the sampling capacitor $C_S$. The current $I_{SMPL}$ therefore has an amplitude that is equal to the charging current $I_{CH}$ minus the reference current $I_{REF}$. Thus, the sampling current $I_{SMPL}$ begins charging the sampling capacitor $C_S$ to increase the amplitude of the sampling voltage $V_{SMPL}$. Because the switch $SW_6$ is open and the switch $SW_7$ is closed during the first switching phase of the switching voltage regulator 1002, the sampling comparator 1028 is not monitoring the sampling voltage $V_{SMPL}$. Therefore, the first comparison signal $CMP_1$ is asserted at a logic-high state.

Referring back to the example of FIG. 4, the switching voltage regulator 1002 switches from the first switching phase to the second switching phase at the time $T_2$. At the time $T_2$, the PFET $P_1$ is deactivated and the NFET $N_1$ is activated by the switching signals $IN_1$ and $IN_2$, respectively, and the NFET $N_2$ remains activated. Additionally, with reference to the example of FIG. 13, the switches $SW_2$, $SW_3$, $SW_9$, $SW_4$, and $SW_7$ are opened by the switching signals $S_1$, $S_3$, $S_9$, $S_4$, and $S_7$, respectively, and the switch $SW_6$ is closed by the switching signal $S_6$. The switch $SW_8$ remains closed during the second switching phase of the switching voltage regulator 1002. Therefore, the current $I_{IN}$ ceases, and the current $I_L$ flows from the low-voltage rail, through the NFET $N_1$, through the inductor $L_1$, and through the NFET $N_2$. Thus, in the example of FIG. 4, the current $I_L$ is demonstrated as decreasing from the amplitude $I_{L2}$ to an amplitude $I_{L3}$ at a time $T_3$. At the time $T_3$, the NFET $N_2$ is deactivated by the switching signal $OUT_1$ and the NFET $N_3$ is activated by the switching signal $OUT_2$. Therefore, the current $I_L$ flows from the low-voltage rail, through the NFET $N_1$, through the inductor $L_1$, and through the NFET $N_3$. Thus, in the example of FIG. 4, the current $I_L$ is demonstrated as decreasing from the amplitude $I_{L3}$ to the initial amplitude $I_{L0}$ at a time $T_4$.

With reference to the example of FIG. 13, in the second switching phase of the switching voltage regulator 1002, the currents $I_1$, $I_2$, and $I_3$ cease. Therefore, the charging current $I_{CH}$ ceases to flow to the sampling node 1016. However, the reference current $I_{REF}$ continues to flow from the sampling node 1016, resulting in the current $I_{REF}$ continuing to draw charge from the sampling capacitor $C_S$. As a result, the sampling voltage $V_{SMPL}$ decreases beginning at the time $T_2$ during the second switching phase of the switching voltage regulator 1002.

Due to the closure of the switch $SW_6$, the sampling comparator 1028 compares the sampling voltage $V_{SMPL}$ at the sampling node 1016 with the voltage at the node 1018, and therefore monitors the voltage across the sampling capacitor $C_S$. Responsive to the sampling voltage $V_{SMPL}$ having an amplitude of approximately zero, and thus the sampling capacitor $C_S$ has approximately zero charge, the sampling comparator 1028 can de-assert the first comparison signal $CMP_1$. Responsive to the de-assertion of the first comparison signal $CMP_1$, and responsive to a logic-low amplitude of the second comparison signal $CMP_2$ as provided by the reference comparator 1034 (e.g., responsive to the reference voltage $V_{REF}$ being greater than the output voltage $V_{OUT}$), the state machine 1032 can change the state of the switching signals IN, OUT, and S. Therefore, the state machine 1032 can switch the switching voltage regulator 1002 from the second switching phase to the first switching phase, and thus the beginning of a next switching period. Therefore, the state machine 1032 can dictate the time duration of the switching periods of the switching voltage regulator 1002 based on the amplitude of the input current $I_{IN}$ relative to the reference current $I_{REF}$ (e.g., based on the sampling voltage $V_{SMPL}$) to regulate the amplitude of the input current $I_{IN}$.

Similar to as described above, upon completion of a switching period, the state machine 1032 can implement an idle (e.g., sleep) mode for the power supply circuit 1000, such as based on a deactivation mode for the power supply circuit 1000 or for a discontinuous mode of operation for the switching voltage regulator 1002. For example, during an idle mode, the switch $SW_8$ is opened by the switching signal $S_8$ to cease the flow of the reference current $I_{REF}$, and the switch $SW_5$ is closed by the switching signal $S_5$ to provide zeroing of the sampling capacitor $C_S$. The switch $SW_6$ can remain closed to latch the first comparison signal $CMP_1$ provided by the sampling comparator 1028. The state machine 1032 therefore can await a change in state of the second comparison signal $CMP_2$ to begin a next switching period.

Accordingly, the examples of FIGS. 7-13 describe other examples of a power supply circuit that can regulate the input current $I_{IN}$ based on the amplitude of the input current $I_{IN}$ relative to the reference current $I_{REF}$ (e.g., based on the sampling voltage $V_{SMPL}$). Therefore, similar to the power supply circuit 200, the power supply circuits 700 and 1000 can regulate the amplitude of the input current $I_{IN}$ in a manner that is more effective than input current regulation in a typical power supply circuit. For example, as described above, the current regulation of the power supply circuits 700 and 1000 is implemented for more complex waveforms of the inductor current $I_L$, as well as non-zero initial amplitudes of the inductor current $I_L$. Additionally, the power supply circuit 700 provides real-time measurement of the input current $I_{IN}$ during each cycle of the switching voltage regulator 702, and thus an amplitude of the inductor current $I_L$, in an open-loop manner that negates the need for bandwidth-limiting stability compensation. Alternatively, the power supply circuit 1000 provides measurement of an estimated amplitude of the input current $I_{IN}$ at each cycle of the switching voltage regulator 1002 to provide for a more simplistic circuit that can achieve superior regulation of the input current $I_{IN}$ relative to a typical power supply circuit. Accordingly, the input current regulation provided by the power supply circuits 700 and 1000 can be substantially more effective than input current regulation of a typical power supply circuit.

In this description, the term "couple" may cover connections, communications, or signal paths that enable a functional relationship consistent with this description. For example, if device A generates a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal generated by device A.

Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device described herein as including certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure, either at a time of manufacture or after a time of manufacture, such as by an end user and/or a third party.

Modifications are possible in the described embodiments, and other embodiments are possible, within the scope of the claims.

What is claimed is:

1. A circuit comprising:
    a switching voltage regulator including a first input, a second input, and an output, the first input coupled to a source of an input current;
    a current regulator including an input, a first output and a second output, the input coupled to the source of the input current, the current regulator configured to provide at the first output a comparison signal having a logic state responsive to a current sampling voltage, the current regulator configured to provide a reference current at the second output proportional to a maximum average amplitude setpoint of the input current over a switching period of the switching voltage regulator; and
    a switch controller including a first input, a second input, a third input and an output, the first input coupled to the first output of the current regulator, the second input coupled to the output of the switching voltage regulator, and the third input adapted to be coupled to a reference voltage source, the output of the switch controller coupled to the second input of the switching voltage regulator;
    wherein the current regulator includes a sampling capacitor having an input to receive a sampling current in a first switching phase of the switching voltage regulator responsive to a switching signal provided from the output of the switch controller; and
    wherein the sampling current includes an amplitude equal to a charging current flowing to the sampling capacitor minus the reference current flowing from the sampling capacitor.

2. The circuit of claim 1, wherein:
    the charging current has an amplitude that is responsive to the input current; and
    the sampling capacitor charges responsive to the sampling current to generate the current sampling voltage.

3. The circuit of claim 2, wherein:
the sampling capacitor discharges during a second switching phase of the switching voltage regulator responsive to the reference current flowing from the sampling capacitor to decrease the current sampling voltage; and
the switch controller monitors the current sampling voltage and switches from the second switching phase to the first switching phase responsive to the current sampling voltage having an amplitude of approximately zero.

4. The circuit of claim 2, wherein:
the current regulator includes a transconductance amplifier configured to monitor the input current to generate the charging current responsive to the input current; and
the charging current includes an amplitude that is proportionally scaled to the input current.

5. The circuit of claim 4, wherein:
the transconductance amplifier is a first transconductance amplifier, the current regulator further comprising:
a second transconductance amplifier configured to generate the reference current; and
a current mirror configured to mirror the reference current through a transistor coupled to the sampling capacitor.

6. The circuit of claim 2, wherein:
the current regulator is configured to switch between a plurality of current sources; and
the current regulator is configured to provide a respective plurality of currents to generate the charging current responsive to at least one of buck and boost operation of the switching voltage regulator.

7. The circuit of claim 1, wherein:
the switch controller comprises:
a sampling comparator including an input that receives the current sampling voltage and an output voltage that provides a first comparison signal;
a reference comparator including a first input to receive the output voltage and a second input to receive a reference voltage, the reference comparator including an output that provides a second comparison signal; and
a state machine including a first input to receive the first comparison signal and a second input to receive the second comparison signal, the state machine also including a first output that provides a switching signal provided from the output of the switch controller and a second output that provides a switch control signal.

8. The circuit of claim 7, wherein:
the current regulator has a second input that receives the switch control signal, the switch control signal controlling a switch to provide a current path of each of the input current and the reference current to generate the current sampling voltage responsive to a switching phase defined by the state machine.

* * * * *